United States Patent [19]
Tasaka et al.

[11] Patent Number: 5,929,165
[45] Date of Patent: Jul. 27, 1999

[54] THERMOPLASTIC ELASTOMERIC RESIN COMPOSITION AND A PROCESS FOR THE PREPARATION THEREOF

[75] Inventors: Michihisa Tasaka, Kawasaki; Toshio Ito, Yokohama; Hiromasa Sanada, Tokyo, all of Japan

[73] Assignee: Riken Vinyl Industry Co., Ltd., Tokyo, Japan

[21] Appl. No.: 08/639,366

[22] Filed: Apr. 26, 1996

[30] Foreign Application Priority Data

| Oct. 27, 1995 | [JP] | Japan | 7-303814 |
| Nov. 28, 1995 | [JP] | Japan | 7-331224 |
| Apr. 17, 1996 | [JP] | Japan | 8-119595 |

[51] Int. Cl.$^6$ ..................... C08L 53/02
[52] U.S. Cl. ............. 525/92 F; 525/92 G; 525/105; 525/98; 525/193; 525/197; 524/269
[58] Field of Search .............. 525/92 G, 92 H, 525/92 F, 98, 99, 105, 193, 197; 524/269

[56] References Cited

U.S. PATENT DOCUMENTS 3,830,767  8/1974  Condon ................... 524/476

FOREIGN PATENT DOCUMENTS

| 7-138418 | of 1995 | Japan . |
| 7-40508  | of 1995 | Japan . |
| 8-34900  | of 1996 | Japan . |

OTHER PUBLICATIONS

Mizuno et al., "Thermoplastic Elastomer Compositions with Good Softness and Fluidity", *Chemical Abstracts*, Abstract No. 124:89988, Oct. 31, 1995 of JP 07286078A2.
Watanuki et al., "Thermoplastic Elastomer Compositions", Chemical Abstracts, Abstract No. 118:82654, Sep. 10, 1992 of JP 04255742 A2.
52–26551/1977 Feb. 1977 Japan, Derwent Abstract.
58–132032/1983 Aug. 1983 Japan, Derwent Abstract.
58–145751/1983 Aug. 1983 Japan, Derwent Abstract.
59–53548/1984 Mar. 1984 Japan, Derwent Abstract.
59–131613/1984 Jul. 1984 Japan, Derwent Abstract.
62–48757 Mar. 1987 Japan, Derwent Abstract.
59–6236/1984 Jan. 1984 Japan, Derwent Abstract.
61–218650/1986 Sep. 1986 Japan, Derwent Abstract.
63–57662/1987 Mar. 1988 Japan, Derwent Abstract.
63–254015/1988 Oct. 1988 Japan, Derwent Abstract.
63–101441/1988 May 1988 Japan, Derwent Abstract.
Japan 1–313548, Dec. 1989, Derwent Abstract.

*Primary Examiner*—Mark L. Warzel
*Attorney, Agent, or Firm*—William H. Dippert; Cowan, Liebowitz & Latman, P.C.

[57] ABSTRACT

The invention provides a process for the preparation of a thermoplastic elastomeric resin composition comprising (a) 100 parts by weight of a block copolymer consisting of at least two polymeric blocks (A) composed of a vinyl aromatic compound and at least one polymeric block (B) composed of a conjugated diene compound, or a hydrogenated block copolymer, (b) 20 to 300 parts by weight of a non-aromatic softening agent for rubber, (c) 1 to 100 parts by weight of a peroxide-crosslinking type olefinic resin or a copolymeric rubber containing said resin, and (d) 10 to 150 parts by weight of a peroxide-decomposition type olefinic resin or a copolymer containing said resin, characterized in that the process comprises a step of heat-processing component (a), component (b), at least a part of component (c) and a part of component (d) in the presence of an organic peroxide to cause crosslinking, and a subsequent step of blending these with the remaining part of component (d) and, if any, the remaining part of component (c). The obtained composition is soft and good in rubber properties, mechanical strength and processability, and is less sticky.

14 Claims, No Drawings

THERMOPLASTIC ELASTOMERIC RESIN COMPOSITION AND A PROCESS FOR THE PREPARATION THEREOF

FIELD OF THE INVENTION

The present invention relates to a thermoplastic elastomeric resin composition and a process for the preparation thereof.

PRIOR ART

Thermoplastic elastomeric resins which are rubber-like materials, do not need a vulcanization process and have molding processability similar as that of thermoplastic resins are attracting attention in the fields of auto parts, parts for electric appliances, electric wire insulation, footwears and general goods.

Various types of such thermoplastic elastomeric resins have been developed and put on sale, such as polyolefine type, polyurethane type, polyester type, polystyrene type and polyvinyl chloride type.

Among those, polystyrene type thermoplastic elastomeric resins such as styrene-butadiene block copolymers (SBS) and styrene-isoprene block copolymers (SIS) have high softness and good rubber elasticity at normal temperature. Further, thermoplastic elastomeric resin compositions obtained from these show good processability.

However, these polymers have problems in resistance to weathering as they have double bonds in conjugated diene blocks in molecule.

To overcome the problems, the double bonds in block copolymers of styrene and conjugated diene are hydrogenated to give elastomeric resins with improved thermal stability.

Several thermoplastic elastomeric resin compositions of such hydrogenated ones have be proposed, for instance, in Japanese Patent Application Laid-Open (hereinafter refereed to as JP Laid-Open) Nos. 50-14742/1975 and 52-26551/1977. As modification of these, JP Laid-Open Nos. 58-132032/1983, 58-145751/1983, 59-53548/1984, 59-131613/1984 and 62-48757 disclose compositions comprising a hydrogenated styrene-conjugated diene block copolymer, a hydrocarbon and an alpha-olefin polymeric resin, and a process for the preparation thereof.

Unfortunately, the thermoplastic elastomeric resin compositions of the prior art comprising such hydrogenated block copolymers have a drawback in rubber properties, such as deformation under heat and pressure (compression set) and rubber elasticity at a high temperature.

To solve such a drawback, there have been proposed a cross-linking composition in which a silane compound is added to a composition containing such a hydrogenated block copolymer, and cross-linked one obtained by cross-linking a composition containing such a hydrogenated block copolymer in the presence of an organic peroxide, for instance, in JP Laid-Open Nos. 59-6236/1984 and 62-57662/1987, Japanese Patent Publication Nos. 3-49927/1991, 3-11291/1991, 3-58381/1991 and 6-13628/1994. Particularly, JP Laid-Open No. 59-6236/1984 discloses a process for the preparation of an elastomeric composition comprising (i) a hydrogenated block copolymer, (ii) a peroxide-crosslinking type olefinic copolymer, (iii) a non-aromatic softening agent for rubber and (iv) a peroxide-decomposition type olefinic resin, wherein component (ii) and, optionally components (iii) and (iv), are heat treated in the presence of an organic peroxide to cause crosslinking and, then, component (i) is blended with the partially cross-linked substances. A part of component (iv) may be blended with the partially cross-linked substances. However, component (i) is not subjected to the crosslinking reaction.

However, such proposed cross-linked compositions of the hydrogenated block copolymer are unsatisfactory in compression set at a high temperature, particularly at 100° C. and, further, do not meet the levels of properties previously required in the fields of vulcanized rubber. Particularly, good processability cannot be attained, and the mechanical strength is low.

In addition, the proposed compositions have some other practical problems. For instance, the surface of a molded article from such compositions shows stickiness due to the decomposition of a peroxide-decomposition type polymer caused in blending with an organic peroxide.

Further, the proposed compositions are apparently more liable to be scratched than PVC or TPU. Accordingly, a lubricant is added in most cases to lower a dynamic friction coefficient so as to improve resistance to scratch. Alternatively, the composition is coated with a ultra-high molecular weight polyethylene or two-color molded to improve the scratch resistance of the thermoplastic elastomer (JP Laid-Open Nos. 5-4522/1993 and 7-40508/1995). However, those need special molding technique and are less applicable for various purposes.

Alternatively, a ultra-high molecular weight polyethylene is blended to attain a sliding property (JP Laid-Open No. 1-313548/1989 and JP Publication 7-81042/1995). However, the thermoplastic elastomer compositions disclosed there have a narrow range of hardness, or are bad in compression set at a high temperature and in resistance to oil.

Further, the proposed compositions mentioned above all have a Shore A hardness of 40 or more. An increased amount of a softening agent has been added to make the composition softer. Then, some problems arise in practice, such as stickiness on the surface of a molded article or bleed-out of the softening agent under heat and stress.

JP Laid-Open No. 7-138418/1995 discloses an olefine-elastomer composition comprising an ethylene-(meth) acrylate copolymer and an ethylene-α-olefine copolymer or a hydrogenated block copolymer consisting of at least one polymeric block (A) composed mainly of a viny aromatic compound and at least one polymeric block (B) composed mainly of a conjugated diene compound. JP Laid-Open No. 8-34900/1996 discloses a composition comprising a hydrogenated block copolymer consisting of at least two polymeric blocks (A) composed mainly of a viny aromatic compound and at least one polymeric block (B) composed mainly of isoprene, and an oil and, optionally, a polyolefine resin, wherein the oil may be an aromatic or non-aromatic softening agent for rubber.

SUMMARY OF THE INVENTION

A purpose of the invention is to provide a process for the preparation of a thermoplastic elastomeric resin composition which is soft and good in rubber properties, mechanical strength and processability, and, is less sticky.

Another purpose of the invention is to provide a composition which shows high resistance to oil and high resistance to scratch as well as the aforesaid properties and a process for the preparation thereof.

A further purpose of the invention is to provide a composition which is ultra-soft and good in rubber properties, mechanical strength and processability, and is less sticky.

Thus, the invention provides a process for the preparation of a thermoplastic elastomeric resin composition comprising (a) 100 parts by weight of a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, (b) 20 to 300 parts by weight of a non-aromatic softening agent for rubber, (c) 1 to 100 parts by weight of a peroxide-crosslinking type olefinic resin or a copolymeric rubber containing said resin, and (d) 10 to 150 parts by weight of a peroxide-decompostion type olefinic resin or a copolymer containing said resin, characterized in that the process comprises a step of heat-processing component (a), component (b), at least a part of component (c) and a part of component (d) in the presence of an organic peroxide to cause crosslinking, and a subsequent step of blending these with the remaining part of component (d) and, if any, the remaining part of component (c).

It is essential that component (a) is also subjected to the heat-processing in the presence of an organic peroxide, whereby component (a) is partially cross-linked and better dispersion of all the components is attained. The obtained composition is soft and good in rubber properties, mechanical strength and processability, and is less sticky.

In a preferred embodiment, (e) 1 to 30 parts by weight of a polyester type thermoplastic elastomer, (f) 0.5 to 10 parts by weight of a silicone having a weight average molecular weight of at least 70,000 or 0.1 to 3 parts by weight of a compound having a perfluoroalkyl group, and (g) 1 to 20 parts by weight of a straight silicone oil having a weight average molecular weight of at most 50,000 are present in said heat processing in the presence of an organic peroxide.

Then, the invention further provides a thermoplastic elastomeric resin composition comprising (a) 100 parts by weight of a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, (b) 20 to 300 parts by weight of a non-aromatic softening agent for rubber, (c) 1 to 100 parts by weight of a peroxide-crosslinking type olefinic resin or a copolymeric rubber containing said resin, and (d) 10 to 150 parts by weight of a peroxide-decompostion type olefinic resin or a copolymer containing said resin, characterized in that the composition further comprises (e) 1 to 30 parts by weight of a polyester type thermoplastic elastomer, (f) 0.5 to 10 parts by weight of a silicone having a weight average molecular weight of at least 70,000 or 0.1 to 3 parts by weight of a compound having a perfluoroalkyl group, and (g) 1 to 20 parts by weight of a straight silicone oil having a weight average molecular weight of at most 50,000.

This composition shows high resistance to oil and high resistance to scratch as well as the properties mentioned above.

In another preferred embodiment of the process according to the invention, the process comprises a step of heat-processing component (a), component (b), at least a part of component (c), at least a part of component (d) and 10 to 100 parts by weight of a hydrogenated petroleum resin in the presence of an organic peroxide to cause crosslinking, and a subsequent step of blending these with the remaining parts of components (c) and (d), if any.

Then, the invention further provides a thermoplastic elastomeric resin composition comprising (a) 100 parts by weight of a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, (b) 20 to 300 parts by weight of a non-aromatic softening agent for rubber, (c) 1 to 100 parts by weight of a peroxide-crosslinking type olefinic resin or a copolymeric rubber containing said resin, and (d) 10 to 150 parts by weight of a peroxide-decompostion type olefinic resin or a copolymer containing said resin, characterized in that the composition further comprises (h) 1 to 100 parts by weight of a hydrogenated petroleum resin.

The last composition is ultra-soft and good in rubber properties, mechanical strength and processability, as is less sticky.

PREFERRED EMBODIMENTS OF THE INVENTION

Component (a), Block Copolymer

Component (a) used in the invention is a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, or a mixture thereof, such as vinyl aromatic compound-conjugated diene compound block copolymers having a structure, A-B-A, B-A-B-A or A-B-A-B-A, or those obtained by hydrogenating such. The block copolymer and/or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists wholly of a vinyl aromatic compound or is a copolymeric block comprising more than 50% by weight, preferably at least 70% by weight, of a vinyl aromatic compound and a conjugated diene compound and/or a hydrogenated conjugated diene compound (hereinafter referred to as (hydrogenated) conjugated diene compound). Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with a vinyl aromatic compound. The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound, respectively. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene and/or isoprene.

Any microstructure may be selected in the polymeric block B composed mainly of the conjugated diene compound. It is preferred that the butadiene block has 20 to 50%, more preferably 25 to 45%, of 1,2-microstructure. In the polyisoprene block, it is preferred that 70 to 100% by weight of isoprene is in 1,4-microstructure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, particularly 10,000 to 400,000. A ratio of the weight average molecular weight (Mw) to the number average molecular weight (Mn), Mw/Mn, is preferably 10 or less, more preferably 5 or less, particularly 2 or less.

Molecule structure of the (hydrogenated) block copolymer may be linear, branched, radial or any combination thereof.

Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS and SEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-microstructure and 90% of the aliphatic double bonds derived from isoprene is hydrogenated. More preferably, 90 to 100% by weight of isoprene has 1,4-microstructure in the aforesaid hydrogenated block copolymer.

Component (a) may be modified, for instance, by maleic anhydrides, epoxides or carboxylic acid.

Component (b), Non-Aromatic Softening Agent for Rubber

Non-aromatic mineral oils and non-aromatic liquid or low molecular weight synthetic softening agents may be used as component (b) of the invention. Mineral oil softening agents used for rubber are mixtures of aromatic cyclic ones, napthenic cyclic ones and paraffinic ones. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (b) according to the invention are the paraffinic type or the naphthenic type. The aromatic softening agents are improper, because they make component (a) soluble and hinder the crosslinking reaction so that physical properties of a composition obtained are not improved. Paraffinic ones are preferred as component (b). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

Component (b) is blended in an amount of 20 to 300 parts by weight, preferably 40 to 150 parts by weight, per 100 parts by weight of component (a). If it is used in an amount of more than 300 parts by weight, bleed-out of the softening agent tends to take place, a final product might be sticky, and mechanical properties are worsened. If it is used in an amount of less than 20 parts by weight, processability of the composition is bad. A part of component (b) may be blended after the heat treatment in the presence of peroxide, which is however not preferred as bleed-out might occur. Component (b) preferably has a weight average molecular weight of 100 to 2,000.

Component (c), Peroxide-Crosslinking Type Olefinic Resin or A Copolymeric Rubber Containing The Same As component (c) of the invention, use may be made of those which mainly starts cross-linking by being heat-treated in the presence of peroxide so that its flowability decreases, such as polyethylene having a polymer density of 0.88 to 0.94 g/cm$^3$, for instance, high density polyethylene, low density polyethylene, linear low density polyethylene and ultra-low density polyethylene, and amorphous random copolymeric elastomers such as ethylene-propylene copolymeric rubber and ehtylene-proplyrene-non-conjugated diene copolyemeric rubber. Among those, polyethylene and ethylene-propylene copolymeric rubber are preferred. Particularly, linear low density polyethylene is suitable, as proper crosslinked structure is attained.

When component (c) is rubber, its Mooney viscosity, ML1+4 (100° C.), is preferably 10 to 120, more preferably 40 to 100. If rubber with a Mooney viscosity of less than 10 is used, rubber properties of an elastomer composition obtained are worse. If rubber with a Mooney viscosity of more than 120, processability is worse and, particularly, appearance of a molded article is worse.

An ethylene content in the copolymer is properly 5 to 50% by weight, preferably 6 to 20% by weight, more preferably 10 to 15% by weight. If the ethylene content is less than 5% by weight, softness of an elastomer composition obtained is insufficient. If it is larger than 50% by weight, mechanical strength is worse. The peroxide-crosslinking type olefinic resin or the copolymer containing the same preferably has a weight average molecular weight of 50,000 to 1,000,000, more preferably 70,000 to 500,000. If it is less than 50,000, rubber properties of an elastomer composition obtained are worse. If it exceeds 1,000,000, processability is worse and, particularly, appearance of a molded article is worse.

Component (c) is blended in an amount of 1 to 100 party by weight, preferably 3 to 50 parts by weight, per 100 parts by weight of component (a). If the amount is less than 1 part by weight, mechanical properties of an elastomer composition obtained are worse. If it exceeds 100 parts by weight, softness and processability of an elastomer composition obtained are worse.

Preferably, at least a half of the amount of component (c), particularly at least 3 parts by weight of component component (c), is blended before the heat treatment in the presence of peroxide. The remaining parts are blended after the heat treatment, whereby various properties may be adjusted as will be discussed below.

Component (d), Peroxide-Decomposition Type Olefinic Resin or A Copolymer Containing The Same Component (d) of the invention attains an effect of improving dispersion of the rubber in the composition obtained so as to improve appearance of a molded article. Component (d) is blended in an amount of 10 to 150 parts by weight, preferably 25 to 100 parts by weight, per 100 parts by weight of component (a). If the amount is less than 10 parts by weight, processability of an elastomer composition obtained is worse. If it exceeds 150 parts by weight, softness and rubber elasticity of an elastomer composition are worse.

A peroxide-decomposition type olefinic resin suitable as component (d) of the invention has Tm of 150 to 167° C. and ΔHm of 25 to 83 mJ/mg, as determined by DSC on its homopolymeric part. Crystalinity may be estimated from Tm and ΔHm. If Tm and ΔHm are out of the aforesaid ranges, rubber elasticity at 100° C. or higher of an elastomer composition obtained is not improved.

It is preferred to use two types of peroxide-decomposition type olefinic resins in combination as will be described below.

Peroxide-decomposition type olefinic resins to be blended before the crosslinking reaction are preferably high molecular weight propylene homopolymers such as isotactic polypropylenes, and high molecular weight copolymers of propylene with a smaller amount of other α-olefine such as 1-butene, 1-hexene or 4-methyl-1-pentene. These resins preferably have an MFR (ASTM D-1238, Condition L, 230° C.) of 0.1 to 10 g/10 min., more preferably 0.1 to 5 g/10 min., particularly 0.1 to 3 g/10 min. Peroxide-decomposition type olefinic resins to be blended after the crosslinking reaction are preferably one or more of highly flowable block or random propylene compolymers or propylene homopolymers, such as isotactic polypropylenes or copolymers of propylene with a smaller amount of other α-olefine such as 1-butene, 1-hexene or 4-methyl-1-pentene. These resins preferably have an MFR of 5 to 200 g/10 min., more preferably 8 to 150 g/10 min., particularly 10 to 100 g/10 min.

If the MFR of the peroxide-decomposition type olefinic resin to be blended before the crosslinking reaction is less than 0.1 g/10 min., processability of an elastomer composition obtained is worse. If it exceeds 10 g/10 min., rubber elasticity of an elastomer composition obtained is worse.

If the MFR of the peroxide-decomposition type olefinic resin to be blended after the crosslinking reaction is less than 5 g/10 min., processability of an elastomer composition obtained is worse. If it exceeds 200 g/10 min., rubber elasticity of a composition obtained is worse.

Component (d) is blended in an amount of 10 to 150 parts by weight, preferably 20 to 80 parts by weight, per 100 parts by weight of component (a). If the amount is less than 10 parts by weight, processability is worse. If it exceeds 150 parts by weight, an elastomer composition obtained is too hard and lacks flexibility, so that it is difficult to obtain an article with rubber-like touch.

According to the invention, a part of component (d), preferably at least 3 parts by weight of component (d), is subjected to the heat treatment in the presence of an organic peroxide, and the remaining part of component (d), preferably at least 5 parts by weight of (d), is blended after the heat treatment. All components are dispersed uniformly by such portionwise addition of component (d), so that stickiness on the surface of a molded article disappears and processability is also improved.

It is preferred that the amount of component (d) to be blended before the crosslinking reaction (X) is less than that after the crosslinking reaction (Y), because the resin composition will have better rubber properties. The aforesaid X and Y may be determined depending upon a final molding process, such as injection molding or extrusion molding, in a specific case.

Component (e), Polyester Type Thermoplastic Elastomer

As component (e) of the invention, use may be made of those which do not cause crosslinking in the heat treatment in the presence of peroxide and, therefore, their flowabilities do not decrease, such as polyetherester block copolymers composed of polybutylene terephthalate as a main hard segment and poly(tetramethyleneoxide)glycol as a soft segment, and polyesterester block copolymers composed of polybutylene terephthalate as a main hard segment and poly-ε-caprolactam or other polyesters as a soft segment. Component (e) is blended in an amount of 130 parts by weight or less, preferably 10 to 60 parts by weight or less, more preferably 10 to 60 parts by weight, per 100 parts by weight of component (a). If the amount exceeds 130 parts by weight, softness of an elastomer composition obtained is low and processability is worse. In a preferred embodiment of the invention where (f) silicone or a compound having a perfluoroalkyl group and (g) straight silicone oil are further blended, component (e) is used in an amount of 1 to 30 parts by weight, preferably 3 to 20 parts by weight, per 100 parts by weight of component (a). If the amount exceeds 30 parts by weight, softness of an elastomer composition obtained and processability are worse. Component (e) preferably has Tm of 160 to 225° C., a D hardness of 30 or more and a hard segment content of 30 to 80%, more preferably a hard segment content of 50 to 80%. Resistance to oil and resistance to heat of the elastomer composition are enhanced by the incorporation of component (e). The resistance to heat used herein refers to temperature dependencies of compression set and hardness.

Component (f), Silicone or A Compound Having A Perfluoroalkyl Group

Silicone as component (f) has a weight average molecular weight of at least 70,000, preferably at least 100,000. There is no particular upper limit on the molecular weight, but it is preferably one million. The silicone may be dimethyl, methylphenyl or methylhydrogen polysiloxane or modified silicone, but not limited to these. The silicone improves processability and molding operability of the composition, and, further, improves surface lubricity and surface gloss of a molded article. For easier handling, the silicone may be compounded with a thermoplastic resin such as polyethylene, polypropylene or polystyrene at a high concentration, e.g., 30 to 70% by weight, A compound with polyethylene is particularly superior in the effects.

The silicone is blended in an amount of 0.5 to 10 parts by weight, preferably 1.5 to 5 parts by weight, per 100 parts by weight of component (a). Even if the amount exceed 10 parts by weight, further improvement is little and, rather, stickiness occurs.

Examples of the compound having a perfluoroalkyl group include perfluoroalkyl sulfonic acid salts, perfluoroaklyl carbonic acid salts, perfluoroalkyl ethyleneoxide adducts, perfluoroalkyl group-containing olefinic oligomers with the last one being preferred. When it is a polymer or oligomer, it preferably has a weight average molecular weight of 2,000 to 20,000, more preferably 5,000 to 10,000.

The compound having a perfluoroalkyl group is blended in an amount of 0.1 to 3 parts by weight, preferably 0.1 to 1.5 parts by weight. The compound having a perfluoroalkyl group may be used together with the aforesaid silicone.

Component (g), Straight Silicon Oil

Component (g), straight silicone oil, has a molecular weight lower than that of the silicone as component (f), and thus has a weight average molecular weight of 5,000 to 50,000, preferably 10,000 to 20,000. Use may be made of dimethyl silicone oils, methylphenyl silicone oils, methylhydrogne silicone oils or modified silicone oils having other organic groups. It its molecular weight is less than 5,000, bleed-out is conspicuous. Regarding a viscosity, those having a viscosity of 100 to 1,000 cSt are proper. The straight silicone oil improves surface lubricity of a molded article.

The straight silicone oil is blended in an amount of 1 to 20 parts by weight, preferably 3 to 10 parts by weight, per 100 parts by weight of component (a). Even if the amount exceeds 20 parts by weight, further improvement is little and, rather, bleed-out becomes conspicuous.

Hydrogenated Petroleum Resin

A hydrogenated petroleum resin may be blended in the invention, if needed. Examples of the hydrogenated petroleum resin include hydrogenated aliphatic petroleum resins, hydrogenated aromatic petroleum resins, hydrogenated copolymer petroleum resins, hydrogenated alicyclic petroleum resins and hydrogenated terpene resins.

The hydrognated petroleum resins may be obtained by hydrogenating, in a conventional manner, petroleum resins produced in conventional processes.

The petroleum resin used herein refers to resineous substances obtained in various processes in the refining industry and the petrochemical industry, or resins obtained by copolymerizing unsaturated hydrocarbons recovered from such processes, particularly from a naphtha cracking process, for instance, aromatic petroleum resins composed mainly of a $C_5$ fraction, aromatic petroleum resins composed mainly of a $C_9$ fraction, copolymeric petroleum resins from those, and alicyclic petroleum resins.

A preferred hydrogenated petroleum resin is of hydrogenated resin type, particularly, such obtained by copolymerizing cyclopentadiene type compounds with vinyl aromatic compounds and hydrogenating the copolymer obtained.

The hydrogenated petroleum resin used in the invention is preferably one which is completely hydrogenated. Partially hydrogenated ones tend to be worse in stability and resistance to weathering.

The hydrogenated petroleum resin is blended in an amount of 100 parts by weight or less, preferably 10 to 100 parts by weight or less, more preferably 10 to 80 parts by weight, per 100 parts by weight of component (a). Even if the amount exceeds 100 parts by weight, a further softening effect on an composition obtained is little and, rather, an action of the petroleum resin as a tackifier becomes conspicuous and mechanical properties become worse as well. If the amount is less than 10 parts by weight, no softening effect on a composition obtained is recognized. If a non-hydrogenated petroleum resin is used, heat stability of a composition obtained is bad, so that the purpose of the invention is not attained.

Inorganic Filler

Inorganic fillers may be blended, if needed. The fillers improve some physical properties, such as a permanent compressive strain of a molded article, and further offer an economical advantage as an extender. Any conventional inorganic fillers may be used, such as calcium carbonate, talc, magnesicum hydroxide, mica, clay, barium sulfate, natural silica, synthetic silica (white carbon), titanium oxide, and carbon black. Among those, calcium carbonate and talc are particularly preferred.

The inorganic filler may be blended in an mount of 0 to 100 parts by weight, preferably 0 to 60 parts by weight, per 100 parts by weight of component (a). If the amount exceeds 100 parts by weight, mechanical strength of an elastomer composition obtained is very low and, further, its hardness is so high that its flexibility is lost and an article with rubber-like touch cannot be obtained.

Electron Doner

Electron doners may be blended. The electron doner used herein means one which has, in its structure, an atom, ion or moiety liable to give an electron to others. There may be named aromatic hydrocarbons such as benzene and naphthalene or substitution derivatives thereof, amines, carboxylic acids, carboxylic aid anhydrides, carboxylic acid esters, alcohols, ethers, ketones, aldehydes, and alcoholates. Examples of the electron-donating atoms or ions include a chloride ion, fluoride ion and iodide ion. Examples of the electron-donating group include an amino group, an imino group, a hydroxyl group, a halogen group, an alkyl group and an allyl group. Examples of the electron-donating monomer include ethyleneimine.

Examples of the aromatic hydrocarbons include benzene, toluene, o-xylene, m-xylene, p-xylene, pseudcumene, isodurene, durene, pentamethyl benzene, hexamethyl benzene, ethyl benzene, propyl benzene, styrene, cumene, mesitylene, cymene, biphenyl, naphthalene, anthracene, indene, phenanthrene, indane, p-terphenyl, diphenylmethane, triphenylmethane, bibenzyl, stilbene and tetralin.

Examples of the carboxylic acids include aliphatic monocarboxylic acids such as formic acid, acetic acid, propionic acid, butyric acid, isobutyric acid, valeric acid, capric acid, pivalic acid, acrylic acid, methacrylic acid and crotonic acid; aliphatic dicarboxylic acids such as malonic acid, succinic acid, glutaric acid, adipic acid, sebacic acid, maleic acid and fumaric acid; alicyclic carboxylic acids such as cyclohexanemonocarboxylic acid, cyclohexenemonocarboxylic acid, cis-1,2-cyclohexanedicaboxylic acid, and cis-4-methylcyclohexene-1,2-dicarboxylic acid; aromatic monocarboxylic acids such as benzoic acid, toluic acid, anisic acid, p-tert.-butyl bezoic acid, naphthoic acid and cinnamic acid; and aromatic polycarboxylic acids such as phthalic acid, isophthalic acid, terephthalic acid, naphthalic acid, trimellitic acid, hemimellitic acid, trimesic acid, pyromellitic acid and mellitic acid.

As the carboxylic acid anhydrides, use may be made of anhydrides of the aforesaid carboxylic acids.

As the carboxylic acid ester, use may be made of mono- or polyester of the aforesaid carboxylic acids, such as butyl formate, ethyl acetate, butyl acetate, isobutyl isobutyrate, propyl pivalate, isobutyl pivalate, ethyl acrylate, ethyl methacrylate, isobutyl methacrylate, diethyl malonate, diisobutyl malonate, dibutyl succinate, diethyl succinate, diethyl glutarate, dibutyl glutarate, diisobutyl glutarate, diisobutyl adipate, dibutyl maleate, diisobutyl maleate, dibutyl sebacate, diethyl sebacate, monomethyl maleate, diethyl tartrate, dibutyl tartrate, diisobutyl tartrate, ethyl cyclohexanecarboxylate, methyl benzoate, ethyl benzoate, methyl p-toluylate, ethyl p-tert.-butylbenzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, dibutyl isophthalate, dibutyl terephthalate, diethyl naphthalate, dibutyl naphthalate, triethyl trimellitate, butyl trimellitate, tetramethyl pyromellitate, tetraethyl pyromellitate and tetrabutyl pyromellitate.

As the carboxylic acid halides, use may be made of halides of the aforesaid caroxylic acids, such as acetyl chloride, acetyl bromide, acetyl iodide, propionyl chloride, butyryl chloride, butyryl bromide, butyryl iodide, pivalyl chloride, pivalyl bromide, acrylyl chloride, acrylyl bromide, acrylyl iodide, methacrylyl iodide, crotonyl chloride, malonyl chloride, succinyl bromide, glutaryl chloride, glutaryl bromide, adipoyl chloride, adipoyl bromide, sebacoyl chloride, sebacoyl bromide, maleoyl chloride, maleoyl bromide, fumaroyl chloride, fumaroyl bromide, tartaroyl chloride, cyclohexanecarboxyloyl chloride, 1-cyclohexenecarboxyl chloride, cis-4-methylcyclohexenecarboxyloyl chloride, cis-4-methylcyclohexenecarboxyloyl bromide, benzoyl chloride, benzoyl bromide, p-toluoyl chloride, p-toluoyl bromide, p-anisoyl chloride, p-anisoyl bromide, α-naphthoyl chloride, cinnamoyl chloride, cinnamoyl bromide, phthaloyl dichloride, phthaloyl dibromide, isophthaloyl dichloride, isophthaloyl dibromide, terephthaloyl dichloride, and naphthaloyl dichloride. Also, use may be made of monoalkyl hlides of dicarboxylic acids, such as methyl chloroformyl adipate, ethyl chloroformyl maleate, methyl chloroformyl maleate and butyl chloroformyl phthalate.

The alcohols may be represented by the general formula: ROH, wherein R is, for instance, an alkyl, alkenyl, cycloalkyl, aryl or aralkyl group having 1 to 12 carbon atoms. There may be named methanol, ethanol, propanol, isopropanol, butanol, pentanol, hexanol, octanol, 2-ethylhexanol, cyclohexanol, benzyl alcohol, allyl alcohol, phenol, crezol, xylenol, ethylphenol, isopropylphenol, p-tert.-butylphenol, and n-octylphenol.

The ethers may be represented by the general formula: ROR', wherein R and R' are, for instance, an alkyl, alkenyl, cycloalkyl, aryl or aralkyl group having 1–12 carbon atoms. R and R' may be sane with or different from each other. R and R' may form a ring together. Examples of the ethers include diethyl ether, diisopropyl ether, dibutyl ether, diisoamyl ether, di-2-ethylhexyl ether, diallyl ether, ethyl allyl ether, diallyl ether, diphenyl ether, arrisol and ethyl phenyl ether. Also, use may be made of cyclic ethers such as tetrahydrofuran, pyran and dioxane; linear ethers such as dimethoxyethane, diethyleneglycol dimethylether and triethyleneglycol dimethylether; cyclic vinyl ethers such as 2,3-dihydrofuran, and 3,4-dihydro-2H-pyran; vinyl ethers such as methyl vinyl ether and ethyl vinyl ether; cyclic allyl ethers such as 2,5-dihydrofuran and 5,6-dihydro-2H-pyran; aliphatic amines such as triethylamine and triethylenediamine; aromatic amines such as pyridine and picoline; and heterocyclic compounds such as 2-oxazoline and 6H-1,2,4-oxadiazine.

In the invention, preferred are toluene and methanol, particularly toluene, as the electron doner.

The incorporation of the electron doner according to the invention has an effect of decreasing the formation of cross-link gel in the thermoplastic elastomer composition produced. That is, it is believed that the electron doner moderates a rate of crosslinking to attain the aforesaid effect.

The amount of the electron doner used in the invention may vary depending upon the electron-donating ability of a particular electron doner used, but may generally be 15 parts by weight or less, preferably 0.5 to 6 parts by weight, more preferably 2 to 3 parts by weight, per 100 parts by weight of component (a) in the case where it is blended before or during the heat treatment in the presence of peroxide. However, the amount may generally be 25 parts by weight or less, preferably 1 to 10 parts by weight, per 100 parts by weight of component (a), if the electron doner is previously mixed (e.g., kneaded) under heat with components (a) through (d) and others. If the electron doner is added in excess of the aforesaid upper limit, a molded article is generally sticky. However, the electron doners with less electron-donating ability may be added in excess of 15 parts by weight. The electron-donating ability is represented by a chain transfer constant of a polymer radical in the use of the electron doner. The chain transfer constant varies with polymer types or reaction temperatures, but the chain transfer constant of a styrene polymer radical at 60° C. ($C_s$) in the use of the electron doner is preferably $10^{-4}$ to $10^{-6}$. When toluene is used as the electron doner, the chain transfer constant of a styrene polymer radical is $1.25 \times 10^{-5}$.

Organic Peroxide

Examples of the organic peroxides used in the invention include dicumyl peroxide, di-tert.-butyl peroxide, 2,5-dimethyl-2,5-di(tert.-butylperoxy)hexane, 2,5-dimethyl-2,5-di(tert.-butylperoxy)hexine-3, 1,3-bis(tert.-butylperoxyisopropyl)benzene, 1,1-bis(tert.-butylperoxy)-3,3,5-trimethylcyclohexane, n-butyl-4,4,-bis(tert.-butylperoxy)valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among those, most preferred are 2,5-dimethyl-2,5-di (tert.-butylperoxy)hexane and 2,5-dimethyl-2,5-di(tert.-butylperoxy)hexine-3 in terms of smell, coloring and scorch stability.

The amount of the peroxide added is preferably 0.1 to 3 parts by weight, more preferably 0.5 to 2.5 parts by weight, particularly 0.8 to 2.5 parts by weight, per total 100 parts by weight of components (a) to (e) present at the time of addition of the peroxide.

Crosslinking Auxiliary

In the partial crosslinking treatment in the presence of the organic peroxide in the process for the preparation of a thermoplastic elastomer composition according to the invention, a crosslinking auxiliary may be blended, such as polyvalent vinyl monomers such as divinylbenzene and triallycyanurate, and polyvalnet methacrylate monomers such as ethyleneglycol dimethacrylate, diethyleneglycol dimethacrylate, triethylenglycol dimethacrylate, polyethylenglycol dimethacrylate, trimethylolpropane trimethacrylate and allyl methacrylate. These compounds will cause the crosslinking reaction more uniformly and more efficiently.

Triethylenegloycol dimethacrylate is most preferred, because this compound is easy to handle and well compatible with a main component to be treated, peroxide-crosslinking type olefinic polymer rubber (c), and this has a solubilizing action for the peroxide to act as a dispersion aid for the peroxide, so that the crosslinking action in the heat treatment is uniform and efficient to give a cross-linked thermoplastic elastomer with a good balance between hardness and rubber elasticity. In addition, triethyleneglycol dimethacrylate is well compatible with the polyester type thermoplastic elastomer, so that surface peeling of a molded article is prevented.

The amount of the crosslinking auxiliary used in the invention is preferably 0.1 to 10 parts by weight, more preferably 1 to 8 parts by weight, particularly 2 to 6 parts by weight, per total 100 parts by weight of components (a) to (e) present at the time of the addition of the crosslinking auxiliary. It is preferred that the amount of the crosslinking auxiliary added is about 2 to 2.5 times as large as the amount of the peroxide added.

Antioxidant

Autioxidant may also be added, if needed, such as phenolic antioxidant such as 2,6-di-tert.-butyl-p-cresol, 2,6-di-tert.-butylphenol, 2,4-di-methyl-6-tert.-butylphenol, 4,4-dihydroxydiphenyl, and tris(2-methyl-4-hydroxy-5-tert.-butylphenyl)butane, phosphite type antioxidants and thioether type antioxidants. Among those, the phenolic antioxidants and the phosphite type antioxidants are preferred.

The amount of the antioxidant is preferably 3 parts by weight or less, more preferably 1 part by weight or less, per total 100 parts by weight of components (a) to (e) present at the time of the addition of the antioxidant. It is preferred to add the antioxidant in a first step of the preparation process mentioned below, so as to prevent hydrolysis of the polyester type thermoplastic elastomer.

The blend ratios among components (a) to (g), the electron doner and the crosslinking auxiliary may actually be determined particularly in consideration of a cross-link degree which affects the quality of a thermoplastic elastomer composition obtained.

Process for the Preparation

The heat processing in the presence of an organic peroxide and the blending in the process for the preparation of the resin composition according to the invention may be carried out by any conventional means. The process of the invention may be carried out, for instance, in the following three steps.

In a first step, component (a), component (b), at least a part of component (c), and a part of component (d) are previously melt and kneaded together with optional additives such as an antioxidant, a light stabilizer, a colorant and a flame retardant. Any conventional means for kneading rubbers or plastics may be used satisfactorily, such as single screw extruders, twin screws extruders, rolls, Banbury mixers, and various kneaders. In this step, a composition is obtained in which all of those components are dispersed uniformly.

In a second step, a peroxide and optionally a crosslinking auxiliary are added to the composition obtained in the first step, and further kneaded under heating to cause crosslinking. Particularly good properties are attained in this way, i.e., by previously kneading components (a) to (d) to have microdispersion and then adding an organic peroxide to cause crosslinking. This step may be carried out, for instance, by twin screws extruders or Banbury mixers.

In a third step, the remaining part of component (d) and, if any, the remaining part of component (c) are added and kneaded. The kneading may be carried out, for instance, by single screw extruders, twin screws extruders, rolls, Banbury mixers, or various kneaders. In this step, dispersion of each component proceeds further and, at the same time, the reaction is completed.

A twin screws extruder with a L/D ratio of 47 or more or a Banbury mixer is preferred as a kneading means, because all of the steps may be carried out continuously. For instance, when a twin screws extruder is operated with a screw rotation speed of 80 to 250 rpm, preferably 80 to 100 rpm, each component is dispersed well to give good properties.

A kneading temperature in the first step is preferably set so that each component melts completely to become easy to mix. A kneading temperature in the second step is preferably chosen so that a sufficient shearing force acts on the organic peroxide and the other components and, further, the reaction proceeds uniformly. In the third step, the temperature is desirably set so that the mixing of all of the components proceeds further and the reaction is completed.

Component (a) shall be added in the first step or, at latest, in the second step, whereby a part of component (a) causes a crosslinking reaction to better the dispersion of each components. The resin composition obtained according to the invention has an improved resistance to heat as seen in the following Examples, unlike in JP Laid-Open 59-6236/1984.

Component (b) is preferably blended in the first step. If it is blended in the third step, it will be a cause for bleed-out.

Component (c) may be blended all in the first step. However, a proper amount of it may be blended in the first step and the remaining part of it may be blended in the third step to adjust the processability, flowability and mechanical strength. The latter case is preferred, because the remaining part of component (c) added in the third step is compatible with components (a) and (c) which were partially cross-linked in the presence of a peroxide and comes into microdispersion, so that physical properties of the elastomer composition obtained, such as mechanical strength, are improved.

As mentioned above, a proper part of component (d) is blended in the first step and the remaining part is blended in the third step, whereby the remaining part of component (d) added in the third step is compatible with the composition which was partially cross-linked in the presence of a peroxide and comes into microdispersion, so that physical properties of the elastomer composition obtained, such as processability, flowability and mechanical strength, are improved.

Component (e) is blended when higher resistances to heat and oil are requested for the elastomer composition. Component (e) may be added in any step. However, it is preferred that a part of component (e) is blended in the third step to attain high resistances to heat and oil. For better compatibility, component (e) is added in the first step or, more preferably in the second step.

The inorganic filler may be blended in either step.

The electron doner may be blended in either one or both of the first step and the second step. It is preferably blended in the second step to give better play to its function and to attain better efficiency. When the electrondoner is blended in the first step, it might volatize during the kneading. Therefore, it is recommended to add to its amount, compared to the case where it is blended in the second step.

When component (e), polyester type elastomer, component (f), silicone or a perfluoroalkyl compound, and component (g), straight silicone oil, are all used in a composition, these may be blended in the first or second step.

A degree of the crosslinking of the thermoplastic elastomer composition thus obtained is represented by a gel ratio and a dynamic elasticity. The gel ratio is determined as follows: 1 g of a sample is wrapped with a 100 mesh wire netting and extracted in boiling xylene in a Soxhlet extractor for 10 hours. A ratio of the weight of the remaining solid to the weight of the sample is the gel ratio. The dynamic elasticity is represented by a storage elasticity of melt viscoelasticity determined by parallel plates.

In the invention, the degree of the crosslinking is preferably such represented by a gel ratio of 30 to 45% by weight, more preferably 40 to 45% by weight, and a storage elasticity of $10^5$ to $10^7$ Pa. Below these ranges, a compression set and resistance to oil of a thermoplastic elastomer composition obtained are bad. Above these ranges, processability is and bad, also, tensile properties deteriorate.

Each component is micro-dispersed more uniformly in the thermoplastic elastomer composition thus obtained, compared to compositions of the prior art. Accordingly, compression set, tensile strength and other physical properties are steadily attained.

The invention will be explained further in detail with reference to the following Examples, but the invention shall not be limited to the Examples.

EXAMPLES

Evaluation

Evaluations in the Examples and the Comparative Examples were made as follows:

Hardness: Determined on the basis of the Japanese Industrial Standards (JIS) K 6301 and JIS S 6050 with a 6.3 mm thick press sheet as a sample.

Tensile strength: determined on the basis of JIS K 6301. A 1 mm thick press sheet was punched out by no. 3 dumbbell. The tensile speed was 500 mm/min.

Tensile elongation: determined on the basis of JIS K 6301. A 1 mm thick press sheet was punched out by no. 3 dumbbell. The tensile speed was 500 mm/min.

Stress at 100% elongation: determined on the basis of JIS K 6301. A 1 mm thick press sheet was punched out by no. 3 dumbbell. The tensile speed was 500 mm/min.

Permanent set at 100% elongation: determined on the basis of JIS K 6301. A 1 mm thick press sheet was punched out by no. 3 dumbbell. The tensile speed was 500 mm/min. After the sample was elongated by 100%, it was held for 10 minutes, and then clamps were loosened. The sample was left free for 10 minutes. Then, the length between the bench marks was measured.

Impact resilience: determined on the basis of BS 903 with a 4 mm thick press sheet as a sample.

Compression set: determined on the basis of JIS K 6262 with a 6.3 mm thick press sheet as a sample. Conditions: 25% deformation; 70° C.×22 hrs., 100° C.×22 hrs., 120° C.×22 hrs., and 140° C.×22 hrs.

Taper abrasion: based on JIS K 7204 with a 3 mm thick press sheet. Weight loss by abrasion was determined after 1,000 turns.

Spiral flow: a composition was injection molded with a 1 mm thick mold for spiral flow test at a resin temperature of 220° C. and an injection pressure of 800 kg/cm². A flow length of the composition was measured.

Dynamic friction coefficient and load to scratch: surface scratching was conducted on a 1 mm thick press sheet using a HEIDON type surface property measuring device, Shintoh Kagaku Co., Type 14 DR. A load with which scratch was recognized (critical load) and a dynamic friction coefficient with a 200 g load were determined. Relative speed, 100 mm/min.; scratching material, sapphire needle (point, 50 μm diameter, 90 R); load, 0 to 600 g.

Tensile strength: based on JIS K 6301. A 2.5 mm thick press sheet was punched out by dumbbell B. Tensile speed was 500 mm/min.

Resistance to oil: based on JIS K 6301. A 1 mm thick press sheet was punched out by No. 3 dumbbell. ASTM No. 2 oil was used. Weight change, volume change, residual tensile strength and stress at 100% elongation were measured after 70° C.×24 hrs. in Examples 1 to 30, Comparative Examples 1 to 17, Examples 39 to 53 and Comparative Examples 30 to 41; or 120° C.×24 hrs. in Examples 31 to 38 and Comparative Examples 18 to 29.

Processability: a composition was molded into a sheet of 8.5 mm×5 mm×3 mm by a 80 tons injection molding machine in Examples 1 to 30 Comparative Examples 1 to 17, Examples 39 to 53 and Comparative Examples 30 to 41; or a sheet of 12.5 mm×13.5 mm×1 mm by a 120 tons injection molding machine in Examples 31 to 38 and Comparative Examples 18 to 29. Processability was evaluated as good when neither delamination nor deformation was recognized and no flow mark which would make appearance very bad appeared.

Stickiness: evaluated as good when, on the molded sheet mentioned immediately above, neither bleeding nor blooming of low molecular weight substances was recognized and no stickiness was felt in touch by fingers.

Cross-link gel: a belt of a 20 mm width and a 0.5 mm thickness was extruded by a laboplastomill (Tohyo Seiki Co.) at 220° C. The number of gels which were 0.5 mm² or larger according to a diagram for determining contaminants (Printing Bureau, the Ministry of Finance of Japan) were counted in the belt of 20 m length by the naked eye and rated as follows:

⊚: no cross-link gel (zero),

○: 1 to 5 cross-link gels,

Δ: 6 to 10 cross-link gels, and

X: many (more than 11) cross-link gels.

Bleed-out: The molded sheet mentioned for the evaluation of processability was compressed by 50% and stored at 100° C. for 22 hours and then released. When neither beeding nor blooming of low molecular weight substances was recognized and no stickiness was felt in tough by fingers, the sheet was rated as ⊚.

Materials used

Component (a): hydrogenated block copolymer, Septon 4055 (Kraray Co.) styren content, 30% by weight; isoprene content, 70% by weight; weight average molecular weight, 130,000; molecular weight distribution (Mw/Mn), 1.3; and hydrogenation ratio, 90% or more.

Component (b): non-aromatic softening agent for rubber, Diana Process Oil PW-90, (Idemitsu Kosan Co.), paraffin type oil, weight average molecular weight, 540; and content of aromatic components, 0.1% or less.

Component (c): peroxide-crosslinking type olefinic resin

PE-1, Idemitsu Petrochemical Co., V-0398CN (LLDPE, weight average molecular weight 80,000)

EP-1, Japan Synthetic Rubber Co., EP 961SP (EPR, weight average molecular weight 150,000)

Component (d): peroxide-decomposition type olefinic resin

PP-1, Asahi Kasei Co., E 1100 (PP, MFR 0.5 g/10 min.)

PP-2, low crystalline PP with Tm of 160° C., ΔHm of 45 mJ/mg, and MFR of 2.5 g/10 min.

PP-3, Mitsubishi Petrochemical Co., BC03B (PP, MFR, 30 g/10 min.)

Component (e): polyester type thermoplastic elastomer, Teijin Co., ELA4110N (ester-ester type)

Inorganic filler: calcium carbonate, Sankyo Seifun Co., RS400

Electron doner: toluene or methanol, Kanto Chemical Co., special grade

Peroxide: 2.5-dimethyl-2.5-di(tert.-butylperoxy)hexane, Nippon Oil & Fats Co., Perhexa 25B Crosslinking anxiliary: triethyleneglycol dimethacrylate, Shinnakamura Kagaku Co., NK Ester 3G Antioxidant: Asahidenka Co., PEP-36.

Examples 1 to 9

A resin composition was prepared in three steps as mentioned above. The three steps were consecutively conducted in a twin screws kneader with a screw rotation of 100 rpm. The materials for the second and third steps were fed via first and second intermediate feeders, respectively. The temperatures in each step are as follows:

first step, 230–240° C., second step, 180–220° C., and third step, 200–220° C.

In the first step, components (a), (b), (c), and PP-1 or PP-2 as a part of component (d) were fed together with the optional component (e), the inorganic filler, the electron doner and the anti-oxidant.

In the second step, the peroxide and the crosslinking auxiliary were fed.

The remaining part of component (d), i.e., PP-3, was fed in the third step.

The amounts of the materials used are shown in weight part in Table 1. The results are as shown in Table 2.

TABLE 1

| Example | 1 | 2 | 3 | 4 | 5 | 6 | 7 | 8 | 9 |
|---|---|---|---|---|---|---|---|---|---|
| Component (a) | 100 | 100 | 100 | 100 | 100 | 100 | 100 | 100 | 100 |
| Component (b) | 104 | 104 | 104 | 104 | 104 | 104 | 104 | 104 | 104 |
| Component (c) | | | | | | | | | |
| PE-1 | 4.2 | 4.2 | 14.6 | 19.8 | 25 | 4.2 | 4.2 | 4.2 | 4.2 |
| EP-1 | | | | | | 5.2 | 15.6 | | 5.2 |
| Component (d) | | | | | | | | | |
| PP-1 | | 10.4 | 16 | 16 | 21 | 10.4 | 16 | 10.4 | 10.4 |
| PP-2 | 21 | | | | | | | | |
| PP-3 | 10.4 | 10.4 | 21 | 31 | 42 | 21 | 42 | 10.4 | 21 |
| Component (e) | | | | | | 31 | 31 | 63 | 31 |
| Inorganic filler | 31 | 31 | 31 | 31 | 31 | 31 | 31 | 31 | |
| Peroxide | 2.1 | 2.1 | 2.1 | 2.1 | 2.1 | 2.1 | 2.1 | 2.1 | 2.1 |
| Cross-link auxiliary | 4.7 | 4.7 | 4.7 | 4.7 | 4.7 | 4.7 | 4.7 | 4.7 | 4.7 |
| Anti-oxidant | 0.2 | 0.2 | 0.2 | 0.2 | 0.2 | 0.2 | 0.2 | 0.2 | 0.2 |

TABLE 2

| Example | 1 | 2 | 3 | 4 | 5 | 6 | 7 | 8 | 9 |
|---|---|---|---|---|---|---|---|---|---|
| Hardness, HDA, 15 sec.after | 41 | 50 | 62 | 70 | 79 | 52 | 71 | 52 | 50 |
| Tensile strength, kg/mm$^2$ | 0.6 | 0.75 | 0.92 | 1.1 | 1.42 | 0.78 | 1.15 | 0.8 | 0.85 |
| Tensile elongation, % | 730 | 740 | 700 | 670 | 630 | 710 | 650 | 690 | 760 |
| Stress at 100% elongation, kg/mm$^2$ | 0.25 | 0.35 | 0.47 | 0.62 | 0.72 | 0.37 | 0.52 | 0.38 | 0.35 |
| Permanent set at 100% elongation, % | 3 | 3 | 3 | 5 | 7 | 3 | 5 | 3 | 3 |
| Impact resilience, % | 68 | 63 | 58 | 55 | 53 | 60 | 53 | 63 | 63 |
| Compression set at 70° C. | 26 | 28 | 30 | 33 | 37 | 31 | 35 | 28 | 30 |
| Compression set at 100° C. | 29 | 30 | 34 | 36 | 42 | 33 | 38 | 30 | 32 |
| Compression set at 120° C. | 30 | 31 | 34 | 35 | 44 | 35 | 41 | 30 | 33 |
| Compression set at 140° C. | 32 | 34 | 36 | 40 | 49 | 38 | 44 | 36 | 35 |
| Taper abrasion, mg/1,000 turns | 240 | 240 | 220 | 200 | 180 | 240 | 210 | 180 | 220 |
| Spiral flow | 80 | 100 | 105 | 120 | 140 | 118 | 135 | — | 125 |
| Tear strength, kg/mm | 35 | 43 | 50 | 55 | 65 | 44 | 52 | 45 | 48 |
| Resistance to oil | | | | | | | | | |
| Residual tensile strength, % | 85 | 86 | 86 | 89 | 90 | 92 | 95 | 93 | 90 |
| Stress at 100% elongation, kg/mm$^2$ | 0.19 | 0.3 | 0.43 | 0.55 | 0.68 | 0.34 | 0.59 | 0.34 | 0.34 |
| Weight change, % | 38 | 35 | 30 | 27 | 20 | 38 | 30 | 25 | 40 |
| Volume change, % | 35 | 30 | 24 | 19 | 14 | 33 | 20 | 21 | 32 |
| Gel ratio, % | 45 | 44 | 42 | 40 | 38 | — | — | — | — |
| Processability | good | good | good | good | good | good | good | good | good |
| Stickiness | good | good | good | good | good | good | good | good | good |

Examples 10 to 16

Compositions were prepared using the materials indicated in Table 3 in a similar manner as in Example 1. The antioxidant was fed in the second step. In Examples 13, 14 and 15, 21 parts by weight of PP-3 were fed in the first step and 10.4 or 31.2 parts of PP-3 were fed in the third step.

The results are as shown in Table 4.

TABLE 3

| Example | 10 | 11 | 12 | 13 | 14 | 15 | 16 |
|---|---|---|---|---|---|---|---|
| Component (a) | 100 | 100 | 100 | 100 | 100 | 100 | 100 |
| Component (b) | 104 | 104 | 104 | 104 | 104 | 104 | 104 |
| Component (c) | | | | | | | |
| PE-1 | 9.4 | 9.4 | 9.4 | 9.4 | 14.6 | 19.8 | 9.4 |
| EP-1 | | | | | | | |
| Component (d) | | | | | | | |
| PP-1 | | | | | | | |
| PP-2 | 21 | 21 | 21 | | | | 21 |
| PP-3 | 10.4 | 10.4 | 10.4 | 21 + 10.4 | 21 + 10.4 | 21 + 31.2 | 10.4 |
| Component (e) | 31 | 31 | 31 | | | | 31 |
| Inorganic filler | | | | | | | |
| Peroxide | 3.1 | 1 | 2.1 | 2.1 | 2.1 | 2.1 | 2.1 |
| Cross-link auxiliary | 4.7 | 9 | 10.5 | 4.7 | 4.7 | 4.7 | 4.7 |
| Anti-oxidant | 0.2 | 0.2 | 0.2 | 0.2 | 0.2 | 0.2 | 0.2 |

TABLE 4

| Example | 10 | 11 | 12 | 13 | 14 | 15 | 16 |
|---|---|---|---|---|---|---|---|
| Hardness, HDA, 15 sec.after | 59 | 57 | 63 | 51 | 60 | 69 | 58 |
| Tensile strength, kg/mm$^2$ | 0.78 | 0.81 | 0.74 | 0.6 | 0.78 | 0.88 | 0.83 |
| Tensile elongation, % | 470 | 630 | 510 | 670 | 600 | 520 | 600 |
| Stress at 100% elongation, kg/mm$^2$ | 0.42 | 0.32 | 0.37 | 0.28 | 0.38 | 0.44 | 0.35 |
| Permanent set at 100% elongation, % | — | — | — | — | — | — | 3 |
| Impact resilience, % | 45 | 43 | 40 | 58 | 53 | 49 | 44 |
| Compression set at 70° C. | 33 | 37 | 27 | 38 | 41 | 45 | 35 |
| Compression set at 100° C. | 36 | 42 | 29 | 41 | 44 | 50 | 40 |
| Compression set at 120° C. | 35 | 44 | 30 | 46 | 51 | 62 | 38 |
| Compression set at 140° C. | 38 | 48 | 34 | 53 | 57 | 67 | 43 |
| Taper abrasion, mg/1,000 turns | — | — | — | — | — | — | 200 |
| Spiral flow | — | — | — | — | — | — | — |
| Tear strength, kg/mm | 27 | 30 | 28 | — | — | — | 28 |
| Resistance to oil | | | | | | | |
| Residual tensile strength, % | 29 | 34 | 35 | — | — | — | 30 |
| Stress at 100% elongation, kg/mm$^2$ | — | — | — | — | — | — | — |
| Weight change, % | 27 | 30 | 28 | — | — | — | 28 |
| Volume change, % | 29 | 34 | 35 | — | — | — | 33 |
| Gel ratio, % | — | — | — | — | — | — | — |
| Processability | rather good | rather good | rather good | good | good | good | good |
| Stickiness | good | good | good | good | good | good | good |

Comparative Example 1

The procedures of Example 9 were repeated with the exception that component (d), PP-3, was fed together with the other component (d), PP-1, in the first step. Nothing was fed in the third step.

The results are as shown in Table 6. From comparison between Example 9 and Comparative Example 1, it is understood that particularly, the compression set at the higher temperatures, the tear strength and the resistance to oil are excellent in the invention.

Comparative Examples to 2 to 7

The procedures of Example 9 were repeated with the materials and the amounts indicated in Table 5. That is, the amount of component (b), (c) or (e) exceeds the upper limit of the invention in Comparative Examples 2 to 6. No peroxide was fed in Comparative Example 7. The results are as shown in Table 6.

TABLE 5

| Comp. Ex. | 1 | 2 | 3 | 4 | 5 | 6 | 7 |
|---|---|---|---|---|---|---|---|
| Component (a) | 100 | 100 | 100 | 100 | 100 | 100 | 100 |
| Component (b) | 104 | 308 | 125 | 125 | 104 | 104 | 104 |
| Component (c) | | | | | | | |
| PE-1 | 4.2 | 9.4 | 104 | 104 | 25 | 4.2 | 9.4 |
| EP-1 | 5.2 | | | | | | |

TABLE 5-continued

| Comp. Ex. | 1 | 2 | 3 | 4 | 5 | 6 | 7 |
|---|---|---|---|---|---|---|---|
| Component (d) | | | | | | | |
| PP-1 | 10.4 | | | | 10.4 | 10.4 | |
| PP-2 | | 21 | 21 | 21 | | | 21 |
| PP-3 | 21 | 10.4 | 10.4 | 21 | 10.4 | 21 | 10.4 |
| Component (e) | 31 | 31 | 31 | 31 | 134 | 134 | 31 |
| Inorganic filler | | | | | | | |
| Peroxide | 2.1 | 2.1 | 2.1 | 2.1 | 2.1 | 2.1 | |
| Cross-link auxiliary | 4.7 | 4.7 | 4.7 | 4.7 | 4.7 | 4.7 | 4.7 |
| Anti-oxidant | 0.2 | 0.2 | 0.2 | 0.2 | 0.2 | 0.2 | 0.2 |

TABLE 6

| Comp. Ex. | 1 | 2 | 3 | 4 | 5 | 6 | 7 |
|---|---|---|---|---|---|---|---|
| Hardness, HDA, 15 sec.after | 50 | 37 | 78 | 95 | 72 | 90 | 39 |
| Tensile strength, kg/mm$^2$ | 0.85 | — | — | — | — | — | 0.45 |
| Tensile elongation, % | 950 | — | — | — | — | — | 480 |
| Stress at 100% elongation, kg/mm$^2$ | 0.20 | — | — | — | — | — | 0.17 |
| Permanent set at 100% elongation, % | 0.2 | — | — | — | — | — | — |
| Impact resilience, % | 57 | 45 | 35 | 25 | 32 | 26 | 48 |
| Compression set at 70° C. | 36 | 35 | 45 | 56 | 42 | 51 | 30 |
| Compression set at 100° C. | 45 | 47 | 48 | 58 | 45 | 52 | 34 |
| Compression set at 120° C. | 58 | 61 | 50 | 62 | 51 | 52 | 34 |
| Compression set at 140° C. | 72 | 67 | 55 | 68 | 57 | 58 | 37 |
| Taper abrasion, mg/1,000 turns | — | — | — | — | — | — | — |
| Spiral flow | — | — | — | — | — | — | — |
| Tear strength, kg/mm | 23 | 45 | 51 | 49 | 15 | 12 | 40 |
| Resistance to oil | | | | | | | |
| Residual tensile strength, % | 40 | 46 | 35 | 33 | 16 | 15 | 64 |
| Stress at 100% elongation, kg/mm$^2$ | 0.15 | — | — | — | — | — | — |
| Weight change, % | 50 | 45 | 51 | 49 | 15 | 12 | 40 |
| Volume change, % | 53 | 46 | 35 | 33 | 16 | 15 | 64 |
| Gel ratio, % | — | — | — | — | — | — | — |
| Processability | good | bad | bad | bad | bad | bad | good |
| Stickiness | good | bad | good | good | good | good | good |

Comparative Examples 8 and 9

The procedures of Example 2 or 4 were repeated in Comparative Example 8 or 9, respectively, with the exception that no peroxide was fed.

Hardnesses of the compositions obtained in Examples 2 and 4 and Comparative Examples 8 and 9 were determined at room temperature, 70° C. and 110° C., to examine their heat resistance. The results are as shown in Table 7.

TABLE 7

| | Ex.2 | Ex.4 | Comp.8 | Comp.9 |
|---|---|---|---|---|
| Room Temperature | 50 | 70 | 50 | 70 |
| 70° C. | 42 | 60 | — | — |
| 110° C. | 38 | 50 | 30 | 40 |

Incorporation of the electron doner

Examples 17 to 30

Toluene or methanol was fed as the electron doner in the second step. Except this, the procedures of Example 1 were repeated. The materials indicated in Tables 8 and 10 were used.

The results are as shown in Tables 9 and 11.

Comparison Examples 10 to 17

Comparison Examples 10 to 16 corresponds to Example 17 to 23, respectively, but toluene was not fed. The results are as sown in Table 13. The number of cross-link gels was larger than 6, while no closs-link gel was observed in Examples 17 to 23.

It should be noted that Comparative Examples 10 to 17 are comparative only in terms of the use of the electron doner, but are still in the scope of the invention.

In Comparative Example 17, toluene was fed in a too large amount, which caused stickiness.

TABLE 8

| Example | 17 | 18 | 19 | 20 | 21 | 22 | 23 |
|---|---|---|---|---|---|---|---|
| Component (a) | 100 | 100 | 100 | 100 | 100 | 100 | 100 |
| Component (b) | 104 | 104 | 104 | 104 | 104 | 104 | 104 |
| Component (c) | | | | | | | |
| PE-1 | 4.2 | 9.4 | 14.6 | 19.8 | 25 | 4.2 | 4.2 |
| EP-1 | | | | | | 5.2 | 15.6 |
| Component (d) | | | | | | | |
| PP-1 | | | | | | 10.4 | 10.4 |
| PP-2 | 21 | 21 | 21 | 21 | 21 | | |
| PP-3 | 5.2 | 104 | 21 | 31 | 42 | 10.4 | 31 |
| Component (e) | | | | | | 31 | 31 |
| Inorganic filler | 31 | 31 | 31 | 31 | 31 | | |
| Toluene | 2 | 2 | 2 | 2 | 2 | 2 | 2 |
| Methanol | | | | | | | |
| Peroxide | 2.1 | 2.1 | 2.1 | 2.1 | 2.1 | 2.1 | 2.1 |
| Cross-link auxiliary | 4.7 | 4.7 | 4.7 | 4.7 | 4.7 | 4.7 | 4.7 |
| Anti-oxidant | 0.2 | 0.2 | 0.2 | 0.2 | 0.2 | 0.2 | 0.2 |

TABLE 9

| Example | 17 | 18 | 19 | 20 | 21 | 22 | 23 |
|---|---|---|---|---|---|---|---|
| Hardness, HDA, 15 sec.after | 40 | 49 | 61 | 69 | 79 | 51 | 71 |
| Tensile strength, kg/mm$^2$ | 0.6 | 0.75 | 0.92 | 1.1 | 1.42 | 0.78 | 1.15 |
| Tensile elongation, % | 730 | 740 | 700 | 670 | 690 | 710 | 650 |
| Stress at 100% elongation, kg/mm$^2$ | 0.25 | 0.35 | 0.47 | 0.62 | 0.72 | 0.97 | 0.52 |
| Permanent set at 100% elongation, % | 9 | 9 | 9 | 5 | 7 | 9 | 5 |
| Impact resilience, % | 72 | 71 | 65 | 60 | 58 | 65 | 60 |
| Compression set at 70° C. | 26 | 28 | 30 | 33 | 37 | 27 | 31 |
| Compression set at 100° C. | 29 | 30 | 34 | 36 | 42 | 29 | 33 |
| Compression set at 120° C. | 30 | 31 | 34 | 35 | 44 | 30 | 34 |
| Compression set at 140° C. | — | — | — | — | — | — | — |
| Taper abrasion, mg/1,000 turns | — | — | — | — | — | — | — |
| Spiral flow | — | — | — | — | — | — | — |
| Tear strength, kg/mm | 35 | 43 | 50 | 55 | 65 | 44 | 52 |
| Resistance to oil | | | | | | | |
| Residual tensile strength, % | 85 | 86 | 86 | 89 | 90 | 92 | 95 |
| Stress at 100% elongation, kg/mm$^2$ | 0.19 | 0.3 | 0.49 | 0.56 | 0.68 | 0.34 | 0.59 |
| Weight change, % | 38 | 35 | 30 | 27 | 20 | 28 | 21 |
| Volume change, % | 35 | 30 | 24 | 19 | 14 | 25 | 19 |
| Gel ratio, % | 43 | 41 | 40 | 37 | 36 | — | — |
| Processability | good | good | good | good | good | good | good |
| Stickiness | good | good | good | good | good | good | good |
| Cross-link gel | ○ | ○ | ○ | ○ | ○ | ○ | ○ |

TABLE 10

| Example | 24 | 25 | 26 | 27 | 28 | 29 | 30 |
|---|---|---|---|---|---|---|---|
| Component (a) | 100 | 100 | 100 | 100 | 100 | 100 | 100 |
| Component (b) | 104 | 104 | 104 | 104 | 104 | 104 | 104 |
| Component (c) | | | | | | | |
| PE-1 | 9.4 | 9.4 | 9.4 | 9.4 | 9.4 | 9.4 | 9.4 |
| EP-1 | | | | | | | |
| Component (d) | | | | | | | |
| PP-1 | | | | | | | |
| PP-2 | 21 | 21 | 21 | 21 | 21 | 21 | 21 |
| PP-3 | 10.4 | 10.4 | 10.4 | 10.4 | 10.4 | 10.4 | 10.4 |
| Component (e) | | | | | | | |
| Inorganic filler | 31 | 31 | 31 | 31 | 31 | 31 | 31 |
| Toluene | 0.5 | 4 | 6 | 10 | 15 | | |
| Methanol | | | | | | 2 | 4 |
| Peroxide | 2.1 | 2.1 | 2.1 | 2.1 | 2.1 | 2.1 | 2.1 |
| Cross-link auxiliary | 4.7 | 4.7 | 4.7 | 4.7 | 4.7 | 4.7 | 4.7 |
| Anti-oxidant | 0.2 | 0.2 | 0.2 | 0.2 | 0.2 | 0.2 | 0.2 |

TABLE 11

| Example | 24 | 25 | 26 | 27 | 28 | 29 | 30 |
|---|---|---|---|---|---|---|---|
| Hardness, HDA, 15 sec.after | 50 | 49 | 49 | 48 | 47 | 50 | 50 |
| Tensile strength, kg/mm$^2$ | 0.75 | 0.8 | 0.85 | 0.82 | 0.8 | 0.75 | 0.78 |
| Tensile elongation, % | 740 | 760 | 790 | 730 | 710 | 740 | 750 |
| Stress at 100% elongation, kg/mm$^2$ | 0.35 | 0.37 | 0.39 | 0.33 | 0.32 | 0.35 | 0.34 |
| Permanent set at 100% elongation, % | 9 | 9 | 9 | 9 | 9 | 9 | 9 |
| Impact resilience, % | 71 | 73 | 73 | 73 | 73 | 71 | 73 |
| Compression set at 70° C. | 28 | 28 | 28 | 28 | 28 | 28 | 28 |
| Compression set at 100° C. | 30 | 30 | 30 | 30 | 30 | 30 | 30 |
| Compression set at 120° C. | 31 | 31 | 31 | 31 | 31 | 31 | 31 |
| Compression set at 140° C. | — | — | — | — | — | — | — |
| Taper abrasion, mg/1,000 turns | — | — | — | — | — | — | — |
| Spiral flow | — | — | — | — | — | — | — |
| Tear strength, kg/mm | 43 | 43 | 43 | 43 | 43 | 43 | 43 |
| Resistance to oil | | | | | | | |
| Residual tensile strength, % | 86 | 86 | 86 | 82 | 81 | 86 | 86 |
| Stress at 100% elongation, kg/mm$^2$ | 0.3 | 0.3 | 0.3 | 0.26 | 0.24 | 0.3 | 0.3 |
| Weight change, % | 35 | 35 | 35 | 38 | 40 | 35 | 35 |
| Volume change, % | 30 | 30 | 31 | 34 | 36 | 30 | 30 |
| Gel ratio, % | 43 | 40 | 38 | 35 | 33 | 43 | 41 |
| Processability | good | good | good | good | good | good | good |

TABLE 11-continued

| Example | 24 | 25 | 26 | 27 | 28 | 29 | 30 |
|---|---|---|---|---|---|---|---|
| Stickiness | good | good | good | good | good | good | good |
| Cross-link gel | ◉ | ○ | ○ | ○ | ○ | ◉ | ◉ |

TABLE 12

| Comp. Ex. | 10 | 11 | 12 | 13 | 14 | 15 | 16 | 17 |
|---|---|---|---|---|---|---|---|---|
| Component (a) | 100 | 100 | 100 | 100 | 100 | 100 | 100 | 100 |
| Component (b) | 104 | 104 | 104 | 104 | 104 | 104 | 104 | 104 |
| Component (c) | | | | | | | | |
| PE-1 | 4.2 | 9.4 | 14.6 | 19.8 | 25 | 4.2 | 4.2 | 9.4 |
| EP-1 | | | | | | 5.2 | 15.6 | |
| Component (d) | | | | | | | | |
| PP-1 | | | | | | 10.4 | 10.4 | |
| PP-2 | 21 | 21 | 21 | 21 | 21 | | | 21 |
| PP-3 | 5.2 | 10.4 | 21 | 31 | 42 | 10.4 | 31 | 10.4 |
| Component (e) | | | | | | 31 | 31 | |
| Inorganic filler | 31 | 31 | 31 | 31 | 31 | | | 31 |
| Toluene | | | | | | | | 20 |
| Methanol | | | | | | | | |
| Peroxide | 2.1 | 2.1 | 2.1 | 2.1 | 2.1 | 2.1 | 2.1 | 2.1 |
| Cross-link auxiliary | 4.7 | 4.7 | 4.7 | 4.7 | 4.7 | 4.7 | 4.7 | 4.7 |
| Anti-oxidant | 0.2 | 0.2 | 0.2 | 0.2 | 0.2 | 0.2 | 0.2 | 0.2 |

TABLE 13

| Comp. Ex. | 10 | 11 | 12 | 13 | 14 | 15 | 16 | 17 |
|---|---|---|---|---|---|---|---|---|
| Hardness, HDA, 15 sec.after | 41 | 50 | 62 | 70 | 79 | 52 | 71 | 47 |
| Tensile strength, kg/mm$^2$ | 0.6 | 0.75 | 0.92 | 1.1 | 1.42 | 0.8 | 1.15 | 0.78 |
| Tensile elongation, % | 730 | 740 | 700 | 670 | 690 | 690 | 650 | 660 |
| Stress at 100% elongation, kg/mm$^2$ | 0.25 | 0.35 | 0.47 | 0.62 | 0.72 | 0.98 | 0.52 | 0.31 |
| Permanent set at 100% elongation, % | 9 | 9 | 9 | 5 | 7 | 9 | 5 | 9 |
| Impact resilience, % | 68 | 69 | 58 | 55 | 59 | 58 | 59 | 71 |
| Compression set at 70° C. | 26 | 28 | 30 | 33 | 37 | 27 | 31 | 28 |
| Compression set at 100° C. | 29 | 30 | 34 | 36 | 42 | 28 | 33 | 30 |
| Compression set at 120° C. | 30 | 31 | 34 | 35 | 44 | 29 | 34 | 31 |
| Compression set at 140° C. | — | — | — | — | — | — | — | — |
| Taper abrasion, mg/1,000 turns | — | — | — | — | — | — | — | — |
| Spiral flow | — | — | — | — | — | — | — | — |
| Tear strength, kg/mm | 35 | 43 | 50 | 55 | 65 | 41 | 52 | 43 |
| Resistance to oil | | | | | | | | |
| Residual tensile strength, % | 85 | 86 | 86 | 89 | 90 | 96 | 95 | 79 |
| Stress at 100% elongation, kg/mm$^2$ | 0.19 | 0.3 | 0.49 | 0.55 | 0.68 | 0.36 | 0.59 | 0.2 |
| Weight change, % | 38 | 35 | 30 | 27 | 20 | 29 | 21 | 40 |
| Volume change, % | 35 | 30 | 24 | 19 | 14 | 19 | 19 | 36 |
| Gel ratio, % | 45 | 44 | 42 | 40 | 38 | — | — | 32 |
| Processability | good | good | good | good | good | good | good | good |
| Stickiness | good | good | good | good | good | good | good | bad |
| Cross-link gel | x | x | x | x | x | Δ | Δ | ○ |

Incorporation of components (e), (f) and (g)

Material used

Components (a) and (b) were same as those used in the above Examples.

PE-1 used here as component (c) was same as PE-1 used in the above Examples, but EP-1 here is EPR, Sumitomo Chemical Industries Co., V-0131.

Component (d):

PP (Mitsui Petrochemical Co., CJ 700), used in the first and their steps in Examples 31 to 35 and Comparative Examples 18 to 28; and in the third step in Example 36.

TPO (Idemitsu Petrochemcial Co., E 2640), which was used in the first step in Examples 36: low crystalline PP with a MFR of 2.5 g/10 min.

Component (e):

TPEE-1: Teijin CO., B 4010 AN, composed of 40% of a hard segment (polybutylene terephtharate) and 60% of a soft segment (polyether-ester type)

TPEE-2: Teijin Co., P 4128 AKN, composed of 40% of a hard segment (polybutyrene terephtharate) and 60% of a soft segment (polyester-ester type)

TPEE-3: Teijin Co., P 4150 AKN, composed of 75% of a hard segment (polybutyrene terephthalate) and 25% of a soft segment (polyester-polyester type).

Component (f):

Toray. Dow. Corning Co., Silicone BY 27002 (a compound of 50% by weight of dimethyl polysiloxane with a weight average molecular weight of 130,000 and 50% by weight of LDPE). In Tables 14 to 18, the amount of component (f) refers to the weight parts of dimethyl polysiloxane only.

Component (g):

Toray. Dow. Corning CO., Silicone SH 200 (dimethyl polysiloxane with a weight average molecular weight of 17,000; viscosity, 1,000 cSt)

The inorganic filler, the peroxide, the crosslinking auxiliary and the anti-oxidant used here were all the same as those used in Example 1. In the following Examples 31 to 38 and Comparative Examples 18 to 29, the inorganic filler was used in the amount of 10 parts by weight; the peroxide, 2.6 parts by weight; the crosslinking auxiliary, 5.7 parts by weight; and the anti-oxidant, 0.2 part by weight.

A lubricant, oleyl amide (mp. 68 to 74° C., Lion Armor Co., Armoslip CP), was used as a comparative material.

Example 31

A composition was prepared as described in Example 1.

In the first step, components (a), (b), (c), a part of component (d), components (e), (f) and (g), the inorganic filler and the anti-oxidant were fed. The peroxide and the crosslinking auxiliary were fed in the second step. The remaining part of component (d) was fed in the third step.

The materials and the amounts used were as indicated in Table 14. The results are as shown in Table 14.

Comparative Examples 18 to 21

Comparative Example 18 to 21 were carried out similarly as Example 31, but components (e), (f) and (g) were not incorporated in Comparative Example 18, and either of component (e), (f) and (g) was not used in Comparative Examples 19 to 21. The results are as shown in Table 14. Resistance to scratch is poor in these Comparative Examples.

Comparative Examples 22 to 25

The amount of component (e), (f) or (g) exceeded the range of the invention in Comparative Examples 22 to 24. The processability, stickiness or bleed-out was bad. In Comparative Example 25, components (e) and (f) were not used and, instead, the amount of component (g) was doubled, compared to Example 31. Then, resistance to scratch was poor.

TABLE 14

|  | Ex.31 | Comp.18 | Comp.19 | Comp.20 | Comp.21 |
| --- | --- | --- | --- | --- | --- |
| Component (a) | 100 | 100 | 100 | 100 | 100 |
| Component (b) | 120 | 120 | 120 | 120 | 120 |
| Component (c) | | | | | |
| PE-1 | 4.2 | 4.2 | 4.2 | 4.2 | 4.2 |
| EP-1 | | | | | |
| Component (d) | | | | | |
| first step | 16 | 16 | 16 | 16 | 16 |
| third step | 21 | 21 | 21 | 21 | 21 |
| Component (e) | | | | | |
| TPEE-1 | | | | | |
| TPEE-2 | | | | | |
| TPEE-3 | 10 | | 10 | 10 | |
| Component (f) | 2.5 | | | 2.5 | 2.5 |
| Component (g) | 5 | | 5 | | 5 |
| Comp. Component, lubricant | | | | | |
| Hardness, HDA, 15 sec.after | 58 | 58 | 58 | 58 | 58 |
| Tensile strength, kg/mm$^2$ | 10 | 10 | 10 | 10 | 10 |
| Tensile elongation, % | 520 | 520 | 520 | 520 | 520 |
| Stress at 100% elongation, kg/mm$^2$ | 2.4 | 2.4 | 2.4 | 2.4 | 2.4 |
| Permanent set at 100% elongation, % | 6 | 6 | 6 | 6 | 6 |
| Impact resilience, % | 58 | 58 | 58 | 58 | 58 |
| Compression set at 70° C. | 30 | 30 | 30 | 30 | 30 |
| Compression set at 100° C. | 34 | 34 | 34 | 34 | 34 |
| Compression set at 120° C. | 34 | 34 | 34 | 34 | 34 |
| Compression set at 140° C. | 36 | 36 | 36 | 36 | 36 |
| Dynamic friction coefficient | 0.35 | 1.1 | 0.65 | 0.84 | 0.73 |
| Load to scratch, g | 380 | 200 | 270 | 280 | 240 |
| Tear strength, kg/mm | 29 | — | — | — | — |
| Resistance to oil | | | | | |
| Residual tensile strength, % | 88 | — | — | — | — |
| Stress at 100% elongation, kg/mm$^2$ | 2.5 | — | — | — | — |
| Weight change, % | 27 | — | — | — | — |
| Volume change, % | 24 | — | — | — | — |
| Gel ratio, % | 39 | — | — | — | — |
| Processability | good | good | good | good | good |
| Stickiness | good | good | good | good | good |
| Bleed-out | ○ | ○ | ○ | ○ | ○ |

TABLE 15

|  | Comp.22 | Comp.23 | Comp.24 | Comp.25 |
|---|---|---|---|---|
| Component (a) | 100 | 100 | 100 | 100 |
| Component (b) | 120 | 120 | 120 | 120 |
| Component (c) | | | | |
| PE-1 | 4.2 | 4.2 | 4.2 | 4.2 |
| EP-1 | | | | |
| Component (d) | | | | |
| first step | 16 | 16 | 16 | 16 |
| third step | 21 | 21 | 21 | 21 |
| Component (e) | | | | |
| TPEE-1 | | | | |
| TPEE-2 | | | | |
| TPEE-3 | 40 | 10 | 10 | |
| Component (f) | 2.5 | 15 | 2.5 | |
| Component (g) | 5 | 5 | 30 | 10 |
| Comp. Component, lubricant | | | | |
| Hardness, HDA, 15 sec.after | 88 | 65 | 55 | 58 |
| Tensile strength, kg/mm$^2$ | 4.5 | 7.5 | 10.5 | 10 |
| Tensile elongation, % | 30 | 340 | 550 | 520 |
| Stress at 100% elongation, kg/mm$^2$ | | 2.1 | 2.4 | 2.4 |
| Permanent set at 100% elongation, % | | | | 6 |
| Impact resilience, % | 45 | 58 | 58 | 58 |
| Compression set at 70° C. | — | — | — | 30 |
| Compression set at 100° C. | — | — | — | 34 |
| Compression set at 120° C. | 68 | 47 | 40 | 34 |
| Compression set at 140° C. | — | — | — | 36 |
| Dynamic friction coefficient | 0.38 | 0.31 | 0.27 | 0.79 |
| Load to scratch, g | 400 | 380 | 360 | 250 |
| Tear strength, kg/mm | — | — | — | |
| Resistance to oil | | | | |
| Residual tensile strength, % | — | — | — | — |
| Stress at 100% elongation, kg/mm$^2$ | — | — | — | — |
| Weight change, % | — | — | — | — |
| Volume change, % | — | — | — | — |
| Gel ratio, % | — | — | — | — |
| Processability | bad | good | good | good |
| Stickiness | good | good | bad | good |
| Bleed-out | ○ | Δ | x | ○ |

Comparative Examples 26 to 28

In Comparative Example 26, use was made of the lubricant which is conventionally used to obtain surface lubricity of a molded article. The results are as shown in Table 16. The lubricant came up to the surface. Thus, the bleed-out property was bad. In Comparative Examples 27 and 28, one or two of components (e), (f) and (g) of the invention were not used and, instead, the lubricant was used. The bleed-out property was bad.

TABLE 16

|  |  |  | Comp.26 | Comp.27 | Comp.28 |
|---|---|---|---|---|---|
| Component | (a) | | 100 | 100 | 100 |
| Component | (b) | | 120 | 120 | 120 |
| Component | (c) | PE-1 | 4.2 | 4.2 | 4.2 |
| | | EP-1 | | | |
| Component | (d) | first step | 16 | 16 | 16 |
| | | third step | 21 | 21 | 21 |
| Component | (e) | TPEE-1 | | | |
| | | TPEE-2 | | | |
| | | TPEE-3 | | | 10 |
| Component | (f) | | | 2.5 | |
| Component | (g) | | | | 5 |
| Comp. Component, lubricant | | | 1.5 | 1.5 | 1.5 |
| Hardness, HDA, 15 sec. after | | | 58 | 58 | 58 |
| Tensile strength, kg/mm$^2$ | | | 10 | 10 | 10 |
| Tensile elongation, % | | | 520 | 520 | 520 |
| Stress at 100% elongation, kg/mm$^2$ | | | 2.4 | 2.4 | 2.4 |
| Permanent set at 100% elongation, % | | | 6 | 6 | 6 |
| Impact resilience, % | | | 58 | 58 | 58 |
| Compression set at 70° C. | | | 30 | 30 | 30 |
| Compression set at 100° C. | | | 34 | 34 | 34 |
| Compression set at 120° C. | | | 34 | 34 | 34 |
| Compression set at 140° C. | | | 36 | 36 | 36 |
| Dynamic friction coefficient | | | 0.56 | 0.48 | 0.51 |
| Load to scratch, g | | | 260 | 300 | 270 |
| Tear strength, kg/mm | | | — | — | — |
| Resistance to oil | | | | | |
| Residual tensile strength, % | | | — | — | — |
| Stress at 100% elongation, kg/mm$^2$ | | | — | — | — |
| Weight change, % | | | — | — | — |
| Volume change, % | | | — | — | — |
| Gel ratio, % | | | — | — | — |
| Processability | | | good | good | good |
| Stickiness | | | good | good | good |
| Bleed-out | | | Δ | Δ | Δ |

Examples 32 to 36

In Examples 32 to 34, a different type of component (e) or (c) from that used in Example 31 was used. As seen from Table 17, the satisfactory results were attained. In Example 35, the amounts of component (d) for the first and third steps and the amount of component (b) were changed from those of Example 31. The good results were attained.

In Example 36, a different type of component (d) was used in the first step, as mentioned above, and the amounts of component (d) in the first and third steps were changed from those of Example 31. The hardness was so small as 39A and, nevertheless, the rubber properties at the higher temperatures, the resistance to oil and the processability were excellent, and the other properties were also good.

TABLE 17

| | | | Ex.32 | Ex.33 | Ex.34 | Ex.24 | Ex.36 |
|---|---|---|---|---|---|---|---|
| Component | (a) | | 100 | 100 | 100 | 100 | 100 |
| Component | (b) | | 120 | 120 | 120 | 42 | 120 |
| Component | (c) | PE-1 | 4.2 | 4.2 | 1.2 | 4.2 | 4.2 |
| | | EP-1 | | | 4.2 | | |
| Component | (d) | first step | 16 | 16 | 16 | 26 | 21 |
| | | third step | 21 | 21 | 21 | 13 | 10 |
| Component | (e) | TPEE-1 | 10 | | | | |
| | | TPEE-2 | | 10 | | | |
| | | TPEE-3 | | | 10 | 10 | 10 |
| Component | (f) | | 2.5 | 2.5 | 2.5 | 2.5 | 2.5 |
| Component | (g) | | 5 | 5 | 5 | 5 | 5 |
| Comp. Exonent, lubricant | | | | | | | |
| Hardness, HDA, 15 sec. after | | | 58 | 58 | 58 | 80 | 39 |
| Tensile strength, kg/mm² | | | 10 | 10 | 10 | 18 | 6.5 |
| Tensile elongation, % | | | 520 | 520 | 520 | 500 | 470 |
| Stress at 100% elongation, kg/mm² | | | 2.4 | 2.4 | 2.4 | 4.7 | 1.4 |
| Permanent set at 100% elongation, % | | | 6 | 6 | 6 | 6 | 6 |
| Impact resilience, % | | | 58 | 58 | 58 | 47 | 67 |
| Compression set at 70° C. | | | 30 | 30 | 30 | 37 | 26 |
| Compression set at 100° C. | | | 34 | 34 | 34 | 42 | 29 |
| Compression set at 120° C. | | | 34 | 34 | 34 | 44 | 30 |
| Compression set at 140° C. | | | 36 | 36 | 36 | 49 | 32 |
| Dynamic friction coefficient | | | 0.37 | 0.36 | 0.35 | 0.32 | 0.4 |
| Load to scratch, g | | | 330 | 310 | 380 | 350 | 390 |
| Tear strength, kg/mm | | | — | — | — | 40 | 17 |
| Resistance to oil | | | | | | | |
| Residual tensile strength, % | | | — | — | — | 97 | 85 |
| Stress at 100% elongation, kg/mm² | | | — | — | — | 4.7 | 1.5 |
| Weight change, % | | | — | — | — | 29 | 35 |
| Volume change, % | | | — | — | — | 26 | 32 |
| Gel ratio, % | | | — | — | — | 37 | 42 |
| Processability | | | good | good | good | good | good |
| Stickiness | | | good | good | good | good | good |
| Bleed-out | | | ⊚ | ⊚ | ⊚ | ⊚ | ⊚ |

Examples 37 and 38 and Comparative Example 29

As component (f), use was made of the following fluorized oligomer alone or together with the aforesaid silicone, BY 27002.

Fluorized oligomer, DIK CO., Megafac F-178 RM (olefinic oligomer having a perfluoroalkyl group, weight average molecular weight 6,500)

As component (d), the aforesaid CJ 700 was used.

The results are as shown in Table 18.

TABLE 18

| | | Ex.37 | Ex.38 | Comp.29 |
|---|---|---|---|---|
| Component (a) | | 100 | 100 | 100 |
| Component (b) | | 120 | 120 | 120 |
| Component (c) | PE-1 | 4.2 | 4.2 | 4.2 |
| | EP-1 | | | |
| Component (d) | first step | 16 | 16 | 16 |
| | third step | 21 | 21 | 21 |
| Component (e) | TPEE-3 | 10 | 10 | 10 |
| Component (f) | fluorized oligomer | 0.5 | 0.3 | 2 |
| | silicone | — | 3 | — |
| Component (g) | | 5 | 5 | — |
| Comp. Component, lubricant | | | | |
| Hardness, HDA, 15 sec. after | | 58 | 58 | 58 |
| Tensile strength, kg/mm² | | 10 | 10 | 10 |
| Tensile elongation, % | | 520 | 520 | 520 |
| Stress at 100% elongation, kg/mm² | | 2.4 | 2.4 | 2.4 |
| Permanent set at 100% elongation, % | | 6 | 6 | 6 |
| Impact resilience, % | | 58 | 58 | 58 |
| Compression set at 70° C. | | 30 | 30 | 30 |
| Compression set at 100° C. | | 34 | 34 | 34 |
| Compression set at 120° C. | | 34 | 34 | 34 |
| Compression set at 140° C. | | 36 | 36 | 36 |
| Dynamic friction coefficient | | 0.4 | 0.35 | 0.85 |
| Load to scratch, g | | 380 | 400 | 280 |
| Tear strength, kg/mm | | 29 | 29 | 29 |
| Resistance to oil | | | | |
| Residual tensile strength, % | | 88 | 88 | 88 |
| Stress at 100% elongation, kg/mm² | | 2.5 | 2.5 | 2.5 |
| Weight change, % | | 27 | 27 | 27 |
| Volume change, % | | 24 | 24 | 24 |
| Gel ratio, % | | 39 | 39 | 39 |
| Processability | | | | |
| Stickiness | | good | good | good |
| Bleed-out | | ⊚ | ⊚ | ⊚ |

Incorporation of the hydrogenated petroleum resin

Components (a), (b) and (c) used below were same as those used in Example 1.

Regarding component (d), PP-1 and PP-3 were same as those used in Example 1, and PP-2 was TPO (Idemitsu Petrochemical Co., E 2640) used in Example 31.

The hydrogenated petroleum resin was Aimarb P-140 (Idemitsu Petrochemical Co., hydrogenated $C_5$-aromatic type copolymeric resin).

The inorganic filler, the peroxide, the crosslinking auxiliary and the anti-oxidant used here were all same as those used in Example 1.

Examples 39 to 46

Compositions were prepared as described in Example 1.

When the hydrogenated petroleum resin was incorporated according to the invention, the whole amount of component (d) may be subjected to the heat treatment in the presence of an organic peroxide, or a part of component (d) may be blended later in the third step.

In Examples 39 to 43 and 45 to 46, the whole amount of component (d) was fed in the first step. Nothing was fed in the third step, but the composition was put through the third step similarly.

In Example 44, component (d), PP-2, was fed in the first step and the remaining component (d), PP-3, was fed in the third step.

The amounts used were as shown in Table 19. The results are as shown in Table 20.

TABLE 19

|  | Ex.39 | Ex.40 | Ex.41 | Ex.42 | Ex.43 | Ex.44 | Ex.45 | Ex.46 |
|---|---|---|---|---|---|---|---|---|
| Component (a) | 100 | 100 | 100 | 100 | 100 | 100 | 100 | 100 |
| Component (b) | 156 | 156 | 156 | 125 | 230 | 156 | 188 | 188 |
| Component (c) | | | | | | | | |
| PE-1 | 4.2 | 4.2 | 4.2 | 4.2 | 4.2 | 4.2 | 4.2 | 4.2 |
| EP-1 | | | | | | | | |
| Component (d) | | | | | | | | |
| PP-1 | | | | | | | | |
| PP-2 | 21 | 21 | 21 | 21 | 21 | 21 | 21 | 21 |
| PP-3 | | | | | | 15 | | |
| Hydrogenated Petro. Resin | 21 | 42 | 100 | 42 | 42 | 42 | 21 | 42 |
| Inorganic filler | 10 | 10 | 10 | 10 | 10 | 10 | 10 | 10 |
| Peroxide | 2.6 | 2.6 | 2.6 | 2.6 | 2.6 | 2.6 | 2.6 | 2.6 |
| Cross-link Auxiliary | 5.7 | 5.7 | 5.7 | 5.7 | 5.7 | 5.7 | 5.7 | 5.7 |
| Anti-oxidant | 0.2 | 0.2 | 0.2 | 0.2 | 0.2 | 0.2 | 0.2 | 0.2 |

TABLE 20

|  | Ex.39 | Ex.40 | Ex.41 | Ex.42 | Ex.43 | Ex.44 | Ex.45 | Ex.46 |
|---|---|---|---|---|---|---|---|---|
| Hardness, HDA, 15 sec.after | 21 | 19 | 13 | 30 | 13 | 30 | 17 | 15 |
| Hardness, Asker C | 43 | 40 | 31 | 53 | 30 | 53 | 37 | 33 |
| Tensile strength, kg/mm$^2$ | 3.4 | 3.5 | 1.0 | 7.0 | 0.9 | 4.8 | 2.7 | 3.8 |
| Tensile elongation, % | 620 | 640 | 560 | 550 | 540 | 650 | 720 | 800 |
| Stress at 100% elongation, kg/mm$^2$ | 0.7 | 0.7 | 0.5 | 1.0 | 0.3 | 1.1 | 0.5 | 0.5 |
| Permanent set at 100% elongation, % | 6 | 6 | 6 | 7 | 6 | 8 | 6 | 6 |
| Impact resilience, % | 73 | 73 | 71 | 65 | 73 | 71 | 73 | 73 |
| Compression set at 70° C. | 29 | 30 | 38 | 33 | 32 | 29 | 28 | 30 |
| Compression set at 100° C. | 32 | 35 | 51 | 39 | 38 | 31 | 34 | 36 |
| Compression set at 120° C. | 40 | 46 | 56 | 46 | 46 | 42 | 48 | 51 |
| Compression set at 140° C. | 51 | 56 | 62 | 50 | 53 | 49 | 57 | 65 |
| Dynamic friction coefficient | 0.86 | 0.87 | | | | 0.76 | 0.87 | 0.86 |
| Tear strength, kg/mm | 12 | 10 | | | | 15 | 10 | 12 |
| Resistance to oil | | | | | | | | |
| Residual tensile strength, % | 83 | 82 | | | | 85 | 82 | 81 |
| Stress at 100% elongation, kg/mm$^2$ | | | | | | | | |
| Weight change, % | 37 | 37 | | | | 35 | 39 | 39 |
| Volume change, % | 34 | 34 | | | | 33 | 36 | 36 |
| Gel ratio, % | 43 | 43 | | | | 42 | 40 | 37 |
| Processability | good | good | good | good | good | good | good | good |
| Stickiness | good | good | good | good | good | good | good | good |
| Bleed-out | ○ | ○ | ○ | ○ | ○ | ○ | ○ | ○ |

Examples 47 to 55

PP-1 or PP-2 as component (d) was fed in the first step, and PP-3 as component (d) was fed in the third step in the amount indicated in Table 21.

In Example 54, PE-1 as component (c) was fed in the first step and EP-1 was fed in the second step. In Example 55, each 2.1 parts of PE-1 was fed both in the first and seconds steps.

The results are as shown Table 22.

TABLE 21

|  | Ex.47 | Ex.48 | Ex.49 | Ex.50 | Ex.51 | Ex.52 | Ex.53 | Ex.54 | Ex.55 |
|---|---|---|---|---|---|---|---|---|---|
| Component (a) | 100 | 100 | 100 | 100 | 100 | 100 | 100 | 100 | 100 |
| Component (b) | 188 | 188 | 146 | 230 | 188 | 188 | 188 | 188 | 188 |
| Component (c) | | | | | | | | | |
| PE-1 | 4.2 | 4.2 | 4.2 | 4.2 | 4.2 | 4.2 | 4.2 | 2.1 | 2.1 + 2.1 |
| EP-1 | | | | | | | | 2.1 | |
| Component (d) | | | | | | | | | |
| PP-1 | | 10 | 10 | 10 | | | | | |

TABLE 21-continued

|  | Ex.47 | Ex.48 | Ex.49 | Ex.50 | Ex.51 | Ex.52 | Ex.53 | Ex.54 | Ex.55 |
|---|---|---|---|---|---|---|---|---|---|
| PP-2 | 21 | 0 | 0 | 0 | 60 | 21 | 21 | 21 | 21 |
| PP-3 | 25 | 10 | 10 | 10 | 10 | 25 | 25 | 15 | 15 |
| Hydrogenated Petro. Resin | 42 | 42 | 42 | 42 | 42 | 42 | 42 | 42 | 42 |
| Inorganic filler | 10 | 10 | 10 | 10 | 10 | 10 | 10 | 10 | 10 |
| Peroxide | 2.6 | 2.6 | 2.6 | 2.6 | 2.6 | 2 | 3 | 2.6 | 2.6 |
| Cross-link Auxiliary | 5.7 | 5.7 | 5.7 | 5.7 | 5.7 | 4.4 | 6.6 | 5.7 | 5.7 |
| Anti-oxidant | 0.2 | 0.2 | 0.2 | 0.2 | 0.2 | 0.2 | 0.2 | 0.2 | 0.2 |

TABLE 22

|  | Ex.47 | Ex.48 | Ex.49 | Ex.50 | Ex.51 | Ex.52 | Ex.53 | Ex.54 | Ex.55 |
|---|---|---|---|---|---|---|---|---|---|
| Hardness, HDA, 15 sec.after | 30 | 30 | 30 | 29 | 31 | 30 | 29 | 30 | 30 |
| Hardness, Asker C | 53 | 53 | 54 | 50 | 54 | 53 | 51 | 53 | 53 |
| Tensile strength, kg/mm$^2$ | 4.1 | 7.2 | 6.2 | 5.2 | 6.5 | 4.1 | 3.9 | 4.8 | 4.8 |
| Tensile elongation, % | 580 | 620 | 550 | 560 | 610 | 560 | 510 | 650 | 650 |
| Stress at 100% elongation, kg/mm$^2$ | 0.8 | 1.8 | 1.5 | 1.4 | 1.6 | 0.9 | 1.1 | 1.1 | 1.1 |
| Permanent set at 100% elongation, % | 7 | 8 | 6 | 6 | 8 | 6 | 6 | 8 | 8 |
| Impact resilience, % | 71 | 71 | 67 | 69 | 61 | 63 | 65 | 71 | 71 |
| Compression set at 70° C. | 31 | 31 | 30 | 30 | 33 | 29 | 28 | 29 | 29 |
| Compression set at 100° C. | 33 | 33 | 35 | 36 | 38 | 33 | 31 | 31 | 31 |
| Compression set at 120° C. | 47 | 45 | 39 | 45 | 45 | 38 | 35 | 42 | 42 |
| Compression set at 140° C. | 52 | 51 | 46 | 54 | 57 | 41 | 39 | 49 | 49 |
| Dynamic friction coefficient | 0.79 | 0.86 |  |  | 0.8 | 0.87 | 0.86 | 0.76 | 0.76 |
| Tear strength, kg/mm | 15 | 20 |  |  | 32 | 32 | 33 | 15 | 15 |
| Resistance to oil |  |  |  |  |  |  |  |  |  |
| Residual tensile strength, % | 84 | 84 |  |  | 75 | 87 |  | 85 | 85 |
| Stress at 100% elongation, kg/mm$^2$ |  |  |  |  |  |  |  |  |  |
| Weight change, % | 36 | 36 |  |  | 35 | 37 | 36 | 35 | 35 |
| Volume change, % | 34 | 34 |  |  | 33 | 34 | 34 | 33 | 33 |
| Gel ratio, % | 37 | 39 |  |  | 37 | 37 | 38 | 42 | 45 |
| Processability | good | good | good | rather good | good | good | good | good | good |
| Stickiness | good | good | good | rather good | good | good | good | good | good |
| Bleed-out | ○ | ○ | ○ | ◎ | ○ | ◎ | ○ | ○ | ○ |

Comparison Examples 30 to 35

Using the materials indicated in Table 23, compositions were prepared as in Example 39. In Comparison Example 30, no hydrogenated petroleum resin was used. In Comparison Examples 31 to 35, the amount of component (b) or the hydrogenated petroleum resin was too small or too large. PP-2 as component (d) was fed in the first step. In Comparison Example 35, PP-3 was further fed in the third step.

The results are as shown in Table 24.

TABLE 23

|  | Comp.30 | Comp.31 | Comp.32 | Comp.33 | Comp.34 | Comp.35 |
|---|---|---|---|---|---|---|
| Component (a) | 100 | 100 | 100 | 100 | 100 | 100 |
| Component (b) | 156 | 156 | 156 | 15 | 350 | 156 |
| Component (c) |  |  |  |  |  |  |
| PE-1 | 4.2 | 4.2 | 4.2 | 4.2 | 4.2 | 4.2 |
| EP-1 |  |  |  |  |  |  |
| Component (d) |  |  |  |  |  |  |
| PP-1 |  |  |  |  |  |  |
| PP-2 | 21 | 21 | 21 | 21 | 21 | 21 |
| PP-3 |  |  |  |  |  | 15 |
| Hydrogenated Petro. Resin |  | 5 | 126 | 42 | 42 | 126 |
| Inorganic filler | 10 | 10 | 10 | 10 | 10 | 10 |
| Peroxide | 2.6. | 2.6 | 2.6 | 2.6 | 2.6 | 2.6 |
| Cross-link Auxiliary | 5.7 | 5.7 | 5.7 | 5.7 | 5.7 | 5.7 |
| Anti-oxidant | 0.2 | 0.2 | 0.2 | 0.2 | 0.2 | 0.2 |

TABLE 24

|  | Comp.30 | Comp.31 | Comp.32 | Comp.33 | Comp.34 | Comp.35 |
|---|---|---|---|---|---|---|
| Hardness, HDA, 15 sec.after | 23 | 22 | 13 | 55 | 10 | 26 |
| Hardness, Asker C | 46 | 44 | 31 | 72 | 26 | 48 |
| Tensile strength, kg/mm$^2$ | 2.8 | 2.7 | 1.1 | 7.5 | 0.6 | 4.0 |
| Tensile elongation, % | 590 | 610 | 560 | 520 | 380 | 480 |
| Stress at 100% elongation, kg/mm$^2$ | 0.5 | 0.5 | 0.4 | 1.6 | 0.1 | 0.4 |
| Permanent set at 100% elongation, % | 6 | 6 | 6 | 7 | 5 | 9 |
| Impact resilience, % | 73 | 73 | 73 | 65 | 73 | 69 |
| Compression set at 70° C. | 28 | 30 | 34 | 32 | 30 | 32 |
| Compression set at 100° C. | 30 | 36 | 43 | 40 | 42 | 35 |
| Compression set at 120° C. | 36 | 40 | 56 | 45 | 56 | 51 |
| Compression set at 140° C. | 45 | 51 | 65 | 53 | 68 | 64 |
| Dynamic friction coefficient | 0.87 |  |  |  |  | 0.85 |
| Tear strength, kg/mm | 10 |  |  |  |  | 8 |
| Resistance to oil |  |  |  |  |  |  |
| Residual tensile strength, % | 81 |  |  |  |  | 80 |
| Stress at 100% elongation, kg/mm$^2$ | 0.19 |  |  |  |  |  |
| Weight change, % | 38 |  |  |  |  | 37 |
| Volume change, % | 35 |  |  |  |  | 34 |
| Gel ratio, % | 45 |  |  |  |  | 37 |
| Processability | bad | bad | good | bad | bad | good |
| Stickiness | good | good | bad | good | bad | bad |
| Bleed-out | ○ | ○ | ○ | ○ | x | ○ |

Comparison Examples 36 to 41

Using the materials indicated in Table 25, compositions were prepared as in Example 39.

PP-1 or PP-2 was fed in the first step, and PP-3 was fed in the third step.

The results are as shown in Table 26.

TABLE 25

|  | Comp.36 | Comp.37 | Comp.38 | Comp.39 | Comp.40 | Comp.41 |
|---|---|---|---|---|---|---|
| Component (a) | 100 | 100 | 100 | 100 | 100 | 100 |
| Component (b) | 188 | 188 | 188 | 188 | 146 | 230 |
| Component (c) |  |  |  |  |  |  |
| PE-1 | 4.2 | 4.2 | 4.2 | 4.2 | 4.2 | 4.2 |
| EP-1 |  |  |  |  |  |  |
| Component (d) |  |  |  |  |  |  |
| PP-1 |  |  |  | 10 | 10 | 10 |
| PP-2 | 21 | 21 | 21 | 0 | 0 | 0 |
| PP-3 |  |  | 25 | 10 | 10 | 10 |
| Hydrogenated Petro. Resin |  | 126 | 126 |  |  |  |
| Inorganic filler | 10 | 10 | 10 | 10 | 10 | 10 |
| Peroxide | 2.6 | 2.6 | 2.6 | 2.6 | 2.6 | 2.6 |
| Cross-link Auxiliary | 5.7 | 5.7 | 5.7 | 5.7 | 5.7 | 5.7 |
| Anti-oxidant | 0.2 | 0.2 | 0.2 | 0.2 | 0.2 | 0.2 |

TABLE 26

|  | Comp.36 | Comp.37 | Comp.38 | Comp.39 | Comp.40 | Comp.41 |
|---|---|---|---|---|---|---|
| Hardness, HDA, 15 sec.after | 19 | 11 | 28 | 34 | 40 | 33 |
| Hardness, Asker C | 41 | 29 | 50 | 55 | 60 | 55 |
| Tensile strength, kg/mm$^2$ | 2.5 | 0.9 | 3.5 | 7.5 | 6.8 | 5.4 |
| Tensile elongation, % | 620 | 580 | 560 | 630 | 520 | 540 |
| Stress at 100% elongation, kg/mm$^2$ | 0.4 | 0.2 | 0.4 | 1.8 | 1.6 | 1.4 |
| Permanent set at 100% elongation, % | 6 | 5 | 8 | 6 | 7 | 6 |
| Impact resilience, % | 73 | 73 | 71 | 69 | 65 | 67 |
| Compression set at 70° C. | 27 | 32 | 33 | 32 | 32 | 34 |
| Compression set at 100° C. | 32 | 45 | 38 | 33 | 36 | 41 |
| Compression set at 120° C. | 41 | 58 | 56 | 46 | 41 | 52 |
| Compression set at 140° C. | 49 | 68 | 63 | 53 | 49 | 62 |
| Dynamic friction coefficient | 0.88 |  | 0.82 |  | 0.88 | 0.87 |
| Tear strength, kg/mm | 8 |  | 9 |  | 25 | 18 |
| Resistance to oil |  |  |  |  |  |  |
| Residual tensile strength, % | 80 |  | 82 |  | 81 | 76 |

TABLE 26-continued

|  | Comp.36 | Comp.37 | Comp.38 | Comp.39 | Comp.40 | Comp.41 |
|---|---|---|---|---|---|---|
| Stress at 100% elongation, kg/mm$^2$ |  |  |  |  |  |  |
| Weight change, % | 39 |  | 40 |  | 35 | 42 |
| Volume change, % | 36 |  | 37 |  | 33 | 39 |
| Gel ratio, % | 39 |  | 33 |  | 43 | 36 |
| Processability | bad | good | good | good | good | good |
| Stickiness | good | bad | bad | good | good | bad |
| Bleed-out | ○ | x | ○ | ○ | ○ | Δ |

We claim:

1. A process for the preparation of a thermoplastic elastomeric resin composition comprising
   (a) 100 parts by weight of a block copolymer consisting of at least two polymeric blocks (A) composed mainly of a vinyl aromatic compound and at least one polymeric block (B) composed mainly of a conjugated diene compound, or a hydrogenated block copolymer obtained by hydrogenating said block copolymer,
   (b) 20 to 300 parts by weight of a non-aromatic softening agent for rubber,
   (c) 1 to 100 parts by weight of a peroxide-crosslinking olefinic resin or a copolymeric rubber containing said resin, and
   (d) 10 to 150 parts by weight of a peroxide-decomposition olefinic resin or a copolymer containing said resin,
   characterized in that the process comprises a step of heat-processing component (a), component (b), at least a part of component (c) and a part of component (d) in the presence of an organic peroxide to cause crosslinking, and a subsequent step of blending these with the remaining part of component (d) and, if any, the remaining part of component (c).

2. The process as described in claim 1, wherein (e) 130 parts by weight or less of a polyester thermoplastic elastomer and 100 parts by weight or less of an inorganic filler are blended in any step.

3. The process as described in claim 1, wherein at least 3 parts by weight of component (d) are subjected to the heat processing in the presence of the organic peroxide, and at least 5 parts by weight of component (d) are blended after said heat processing.

4. The process as described in claim 1, wherein at least a half amount of component (c) is subjected to said heat processing.

5. The process as described in claim 1, wherein the crosslinking is carried out in the presence of an ethylenically unsaturated monomer as a crosslinking auxiliary.

6. The process as described in claim 1, wherein 15 parts by weight or less of an electron doner are blended before or during the heat processing.

7. The process as described in claim 1, wherein 25 parts by weight or less of an electron doner are previously mixed with components (a) through (d), a polyester thermoplastic elastomer and an inorganic filler under heating before the heat processing in the presence of the organic peroxide.

8. The process as described in claim 1, wherein (e) 1 to 30 parts by weight of a polyester thermoplastic elastomer, (f) 0.5 to 10 parts by weight of a silicone having a weight average molecular weight of at least 70,000 or 0.1 to 3 parts by weight of a compound having a perfluoroalkyl group, and (g) 1 to 20 parts by weight of a straight silicone oil having a weight average molecular weight of at most 50,000 are present in said heat processing in the presence of an organic peroxide.

9. A process for the preparation of a thermoplastic elastomeric resin composition comprising
   (a) 100 parts by weight of a block copolymer consisting of at least two polymeric blocks (A) composed mainly of a vinyl aromatic compound and at least one polymeric block (B) composed mainly of a conjugated diene compound, or a hydrogenated block copolymer obtained by hydrogenating said block copolymer.
   (b) 20 to 300 parts by weight of a non-aromatic softening agent for rubber,
   (c) 1 to 100 parts by weight of a peroxide-crosslinking olefinic resin or a copolymeric rubber containing said resin, and
   (d) 10 to 150 parts by weight of a peroxide-decomposition olefinic resin or a copolymer containing said resin,
   characterized in that the process comprises a step of heat-processing component (a), component (b), at least a part of component (c), a part of component (d) and 10 to 100 parts by weight of a hydrogenated petroleum resin in the presence of an organic peroxide to cause crosslinking, and a subsequent step of blending these with the remaining part of component (d) and, if any, the remaining part of component (c).

10. The process as described in claim 9, wherein 100 parts by weight or less of an inorganic filler are blended in any step.

11. The process as described in claim 9, wherein at least 3 parts by weight of component (d) are subjected to the heat processing in the presence of the organic peroxide, and at least 5 parts by weight of component (d) are blended after said heat processing.

12. The process as described in claim 9, wherein at least a half amount of component (c) is subjected to said heat processing.

13. The process as described in claim 9, wherein the crosslinking is carried out in the presence of a crosslinking auxiliary, ethylenically unsaturated monomer.

14. The process as described in claim 9, wherein 15 parts by weight or less of an electron doner are blended before or during the heat processing.

* * * * *